Jan. 13, 1959　　W. T. GOLLWITZER　　2,868,115
PRINTING MACHINES
Filed Feb. 28, 1955　　12 Sheets-Sheet 4

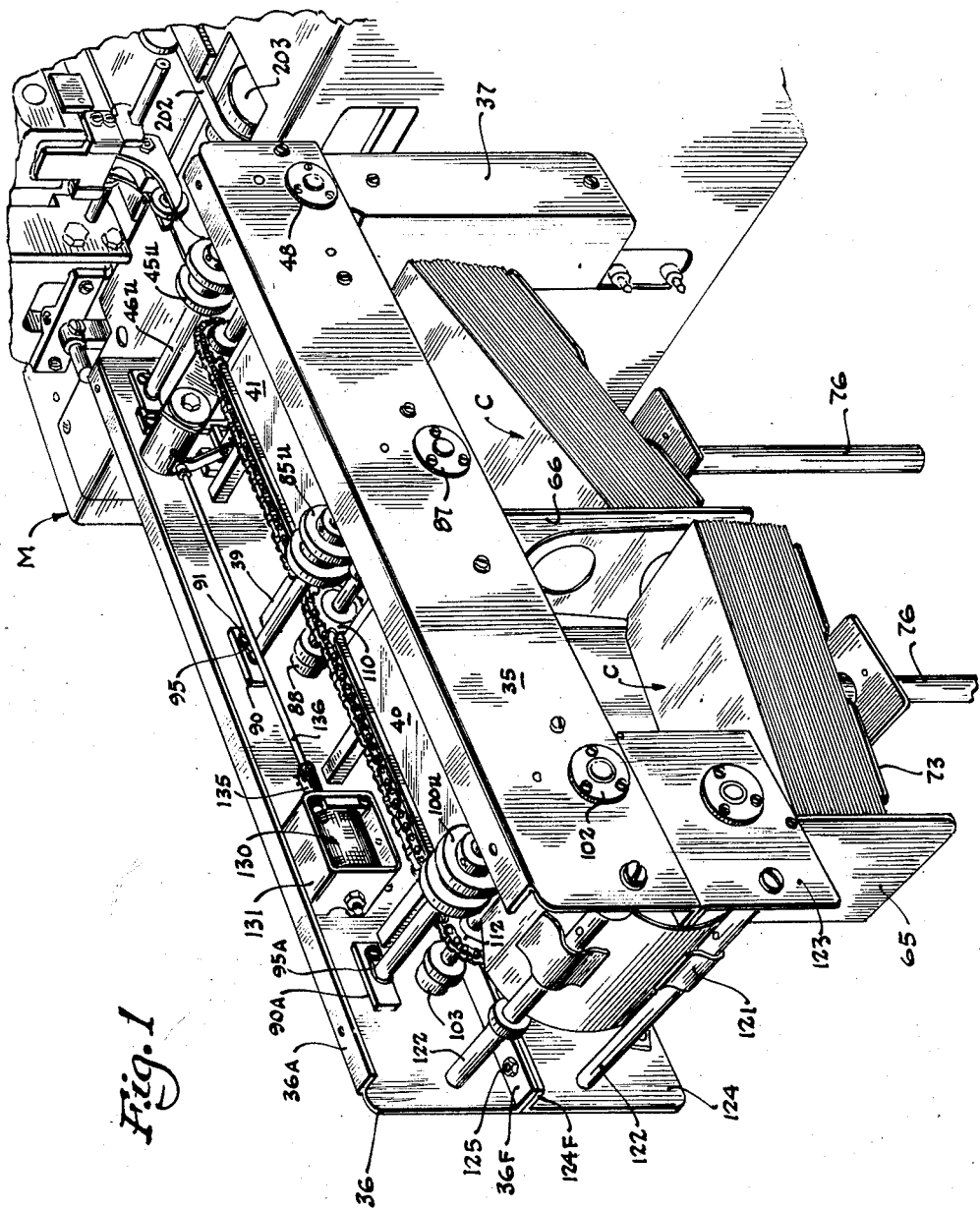

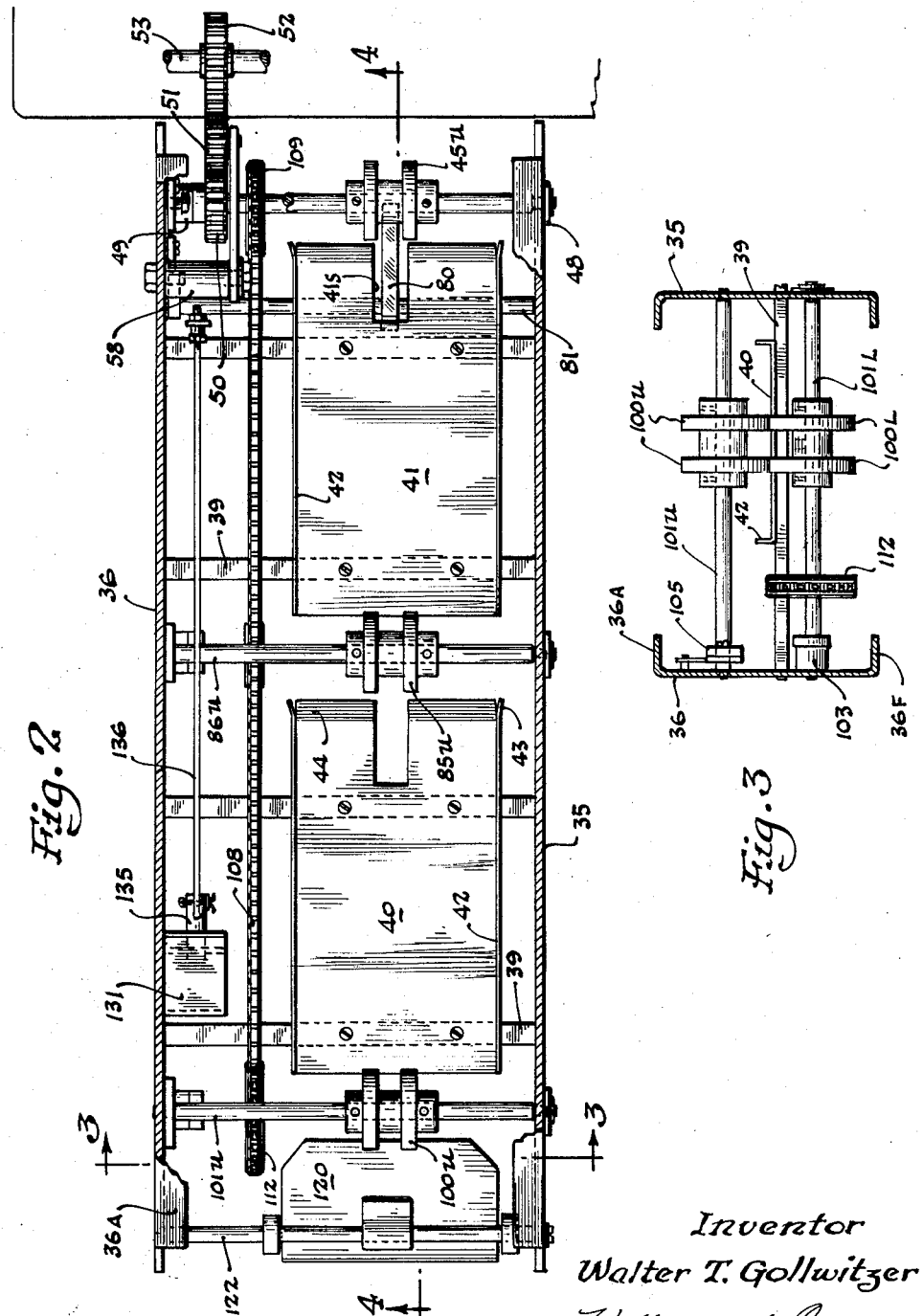

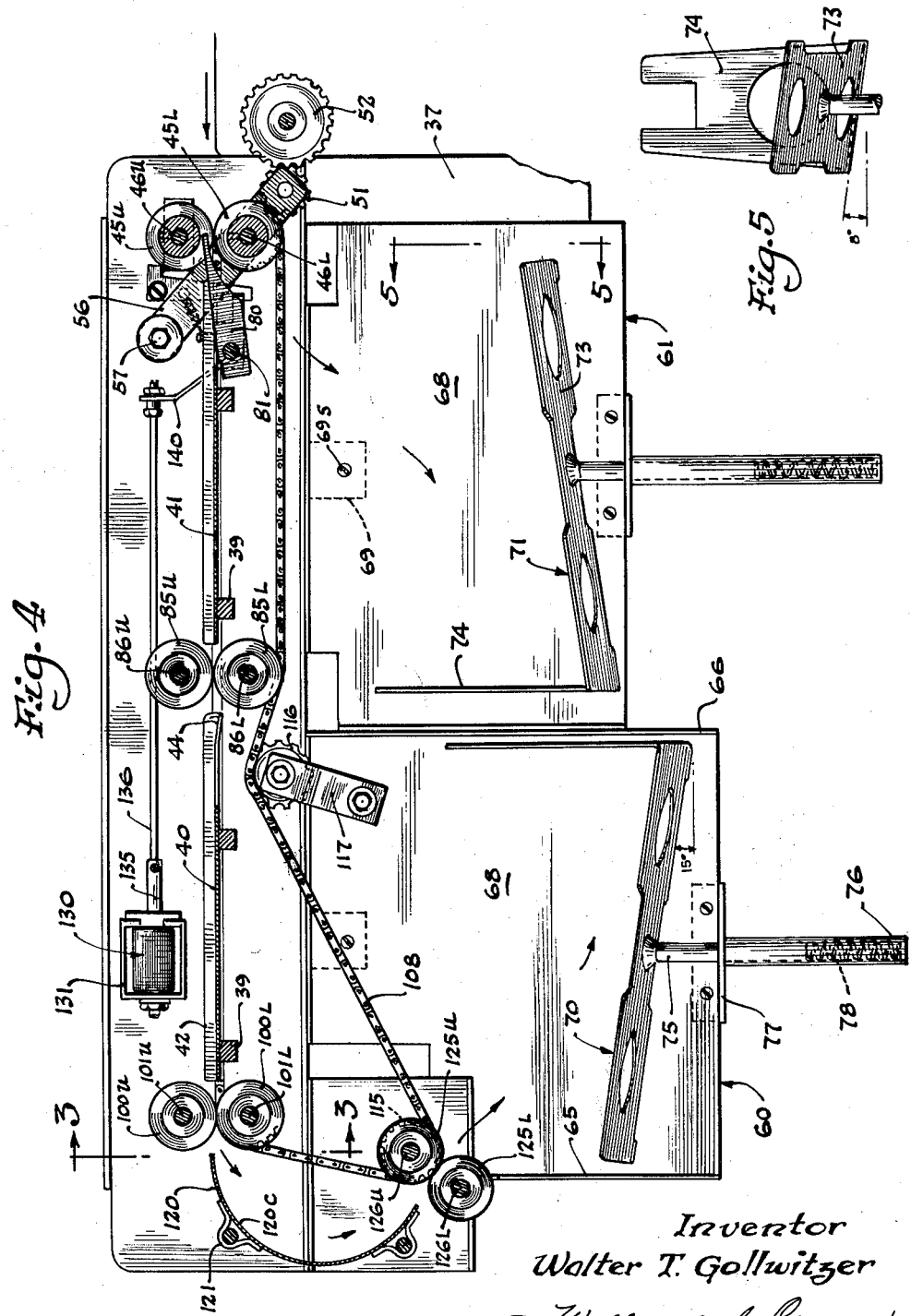

Inventor
Walter T. Gollwitzer
By Wallace and Cannon
Attorneys

Jan. 13, 1959 W. T. GOLLWITZER 2,868,115
PRINTING MACHINES
Filed Feb. 28, 1955 12 Sheets-Sheet 5

Inventor
Walter T. Gollwitzer
By Wallace and Cannon
Attorneys

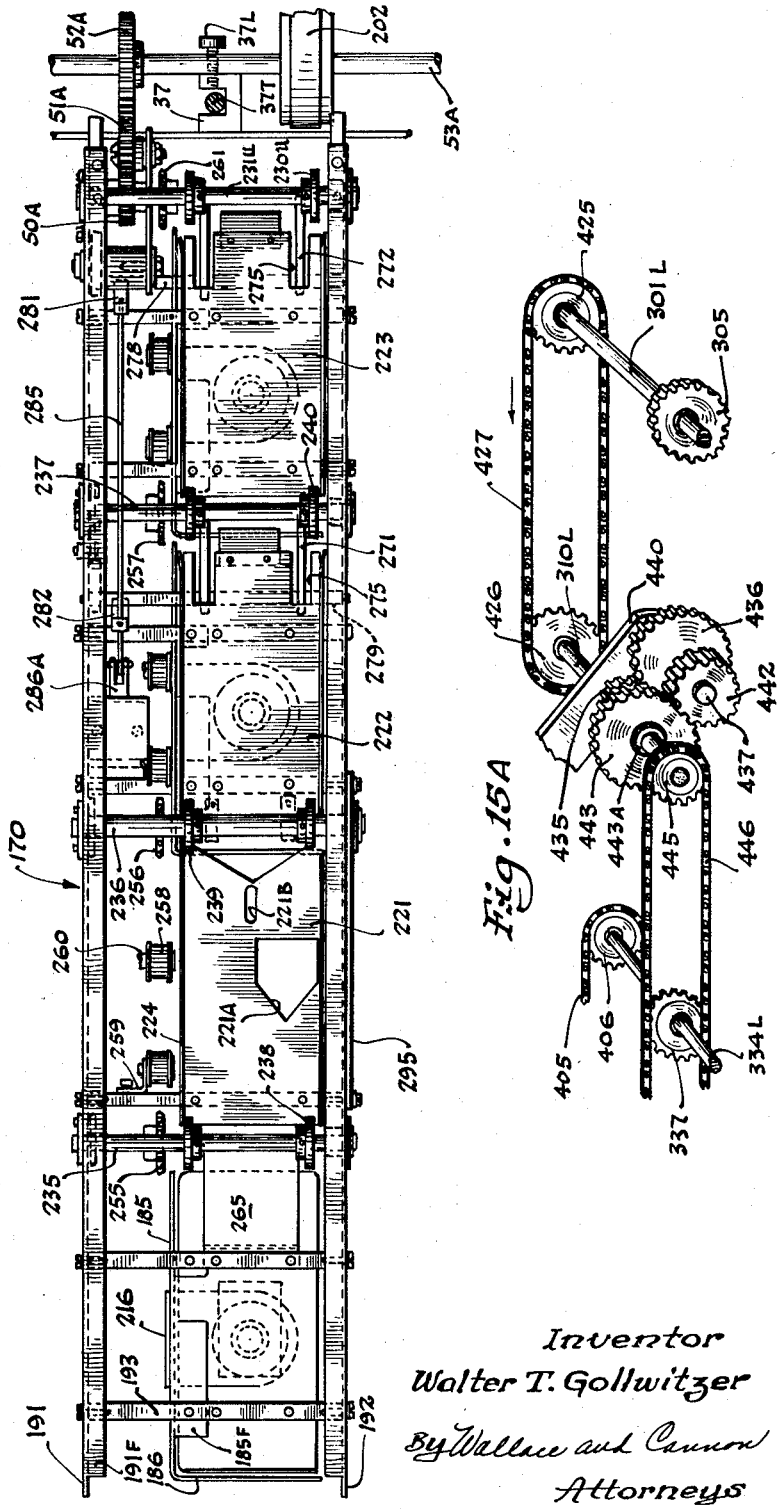

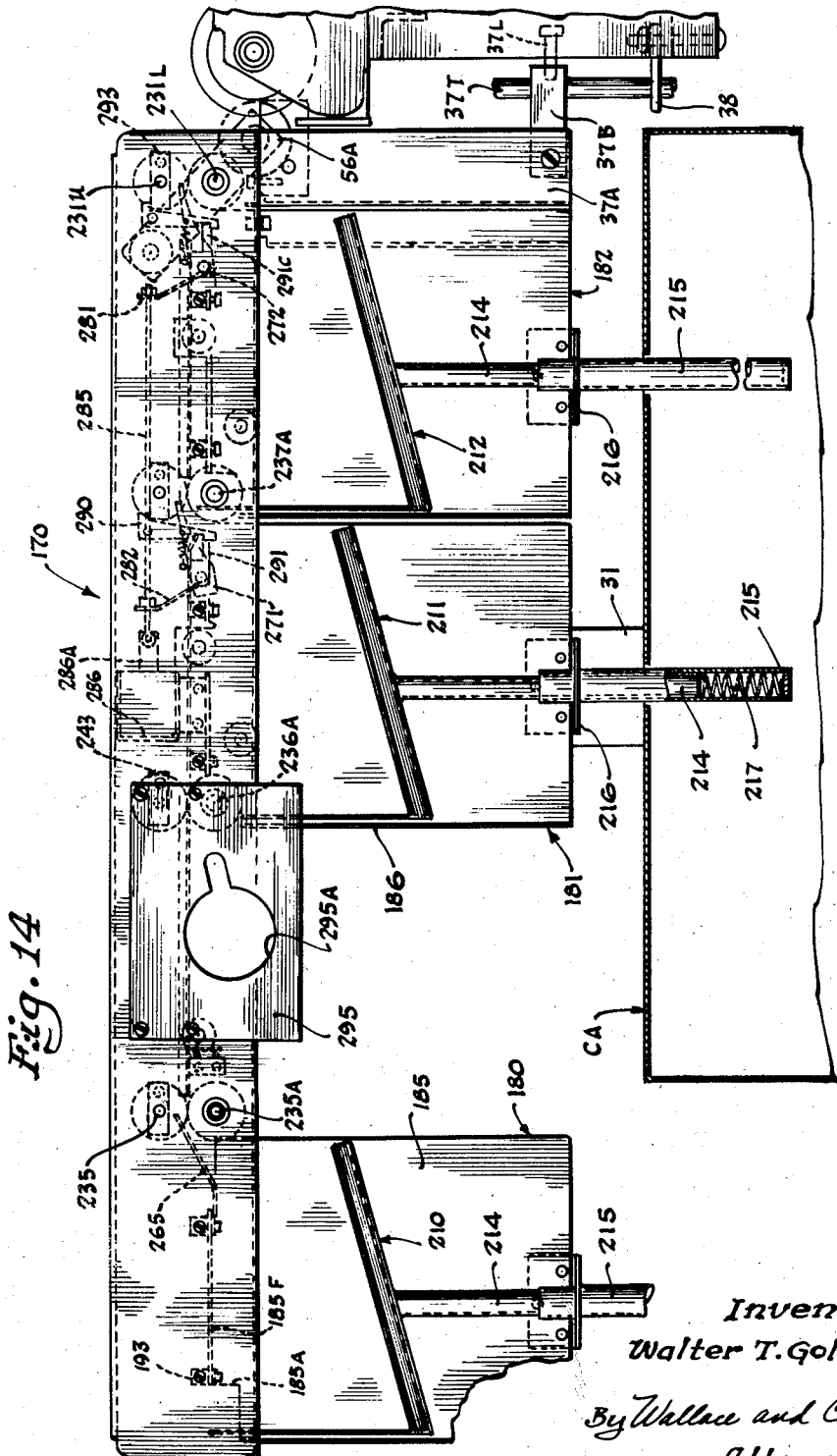

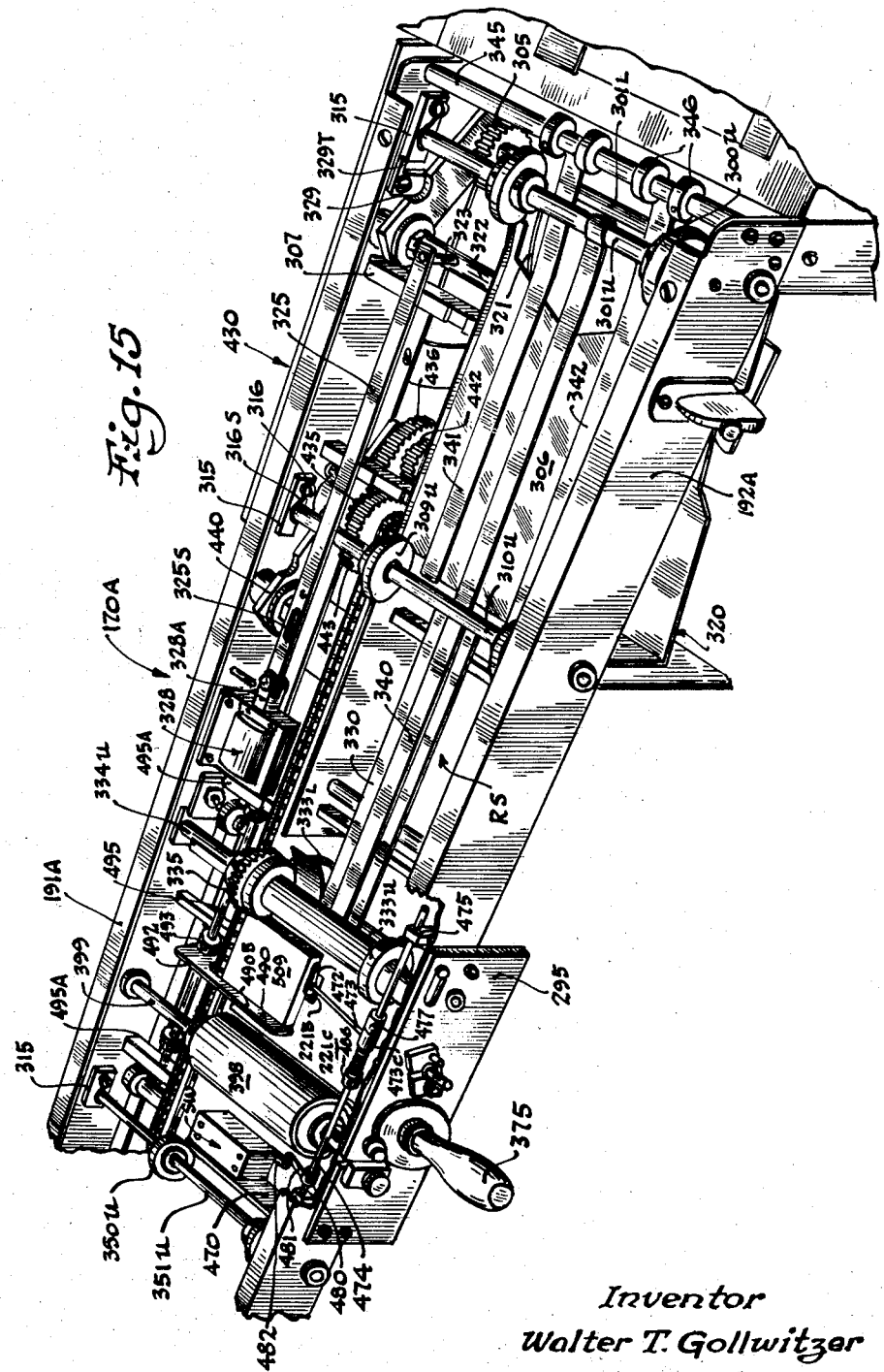

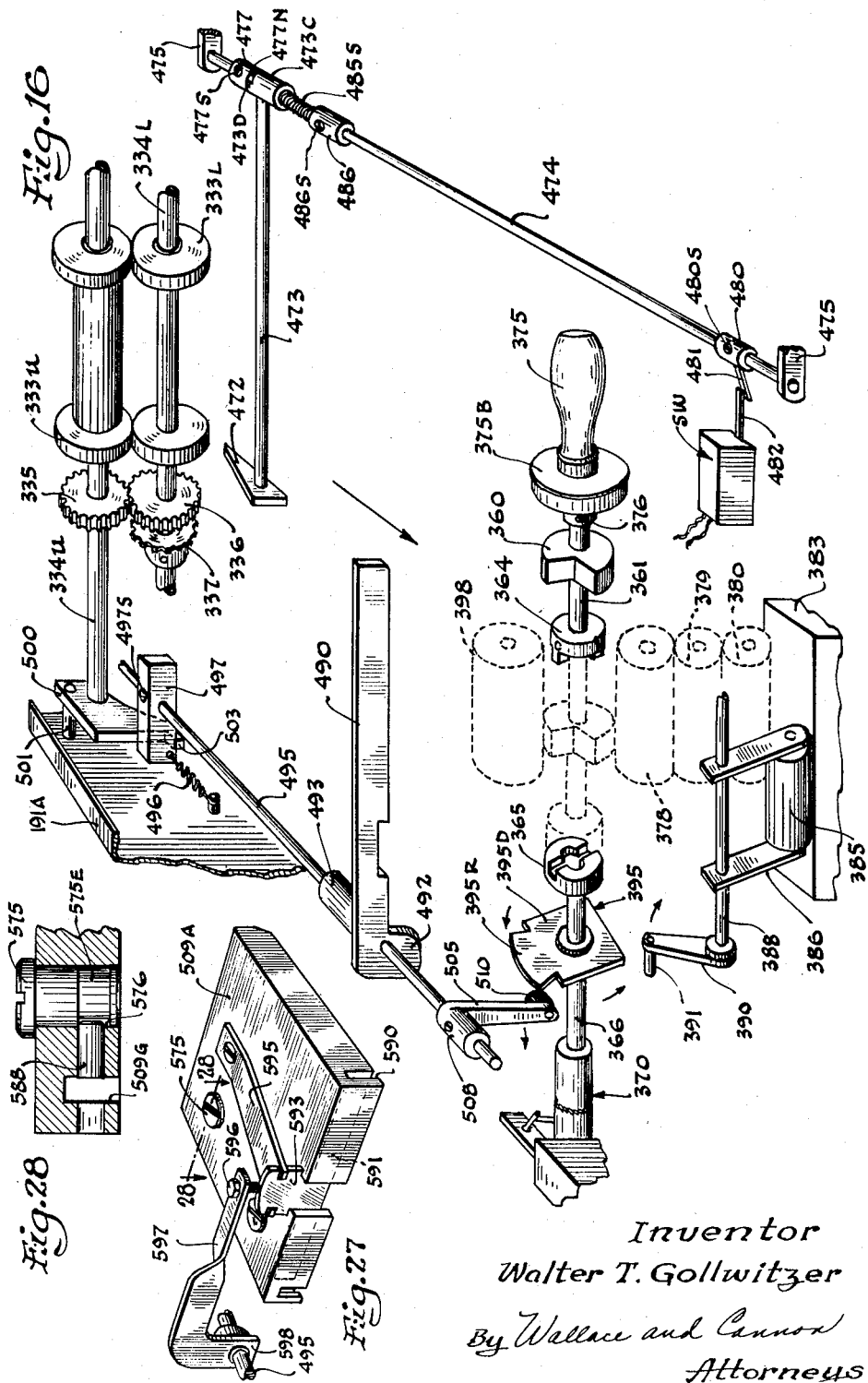

Jan. 13, 1959  W. T. GOLLWITZER  2,868,115
PRINTING MACHINES
Filed Feb. 28, 1955  12 Sheets-Sheet 10
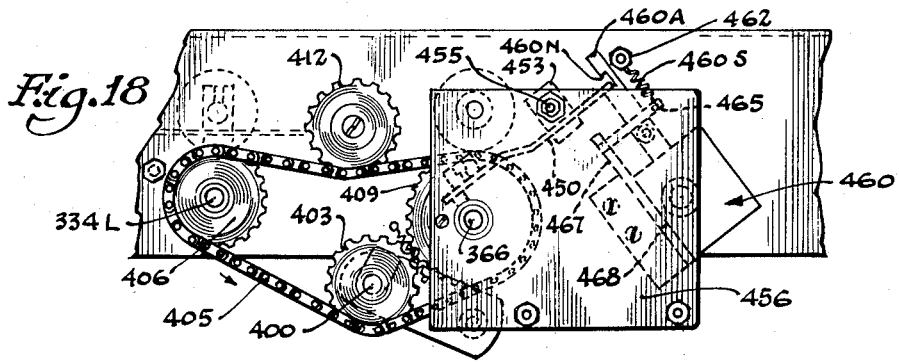
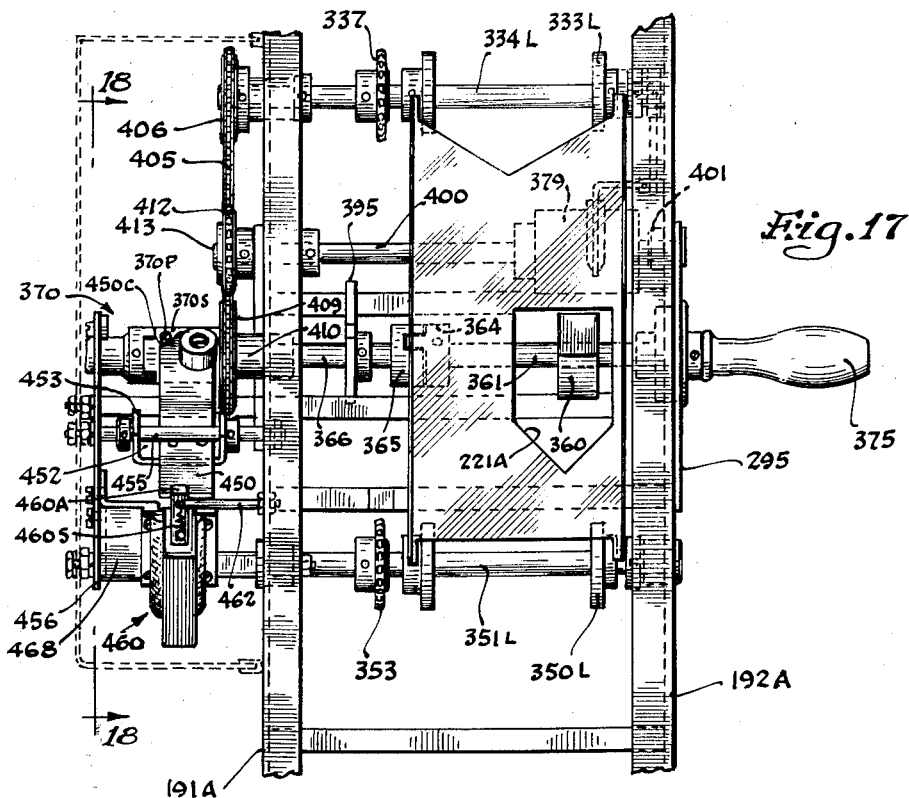
Inventor
Walter T. Gollwitzer
By Wallace and Cannon
Attorneys Jan. 13, 1959 W. T. GOLLWITZER 2,868,115
PRINTING MACHINES
Filed Feb. 28, 1955 12 Sheets-Sheet 11
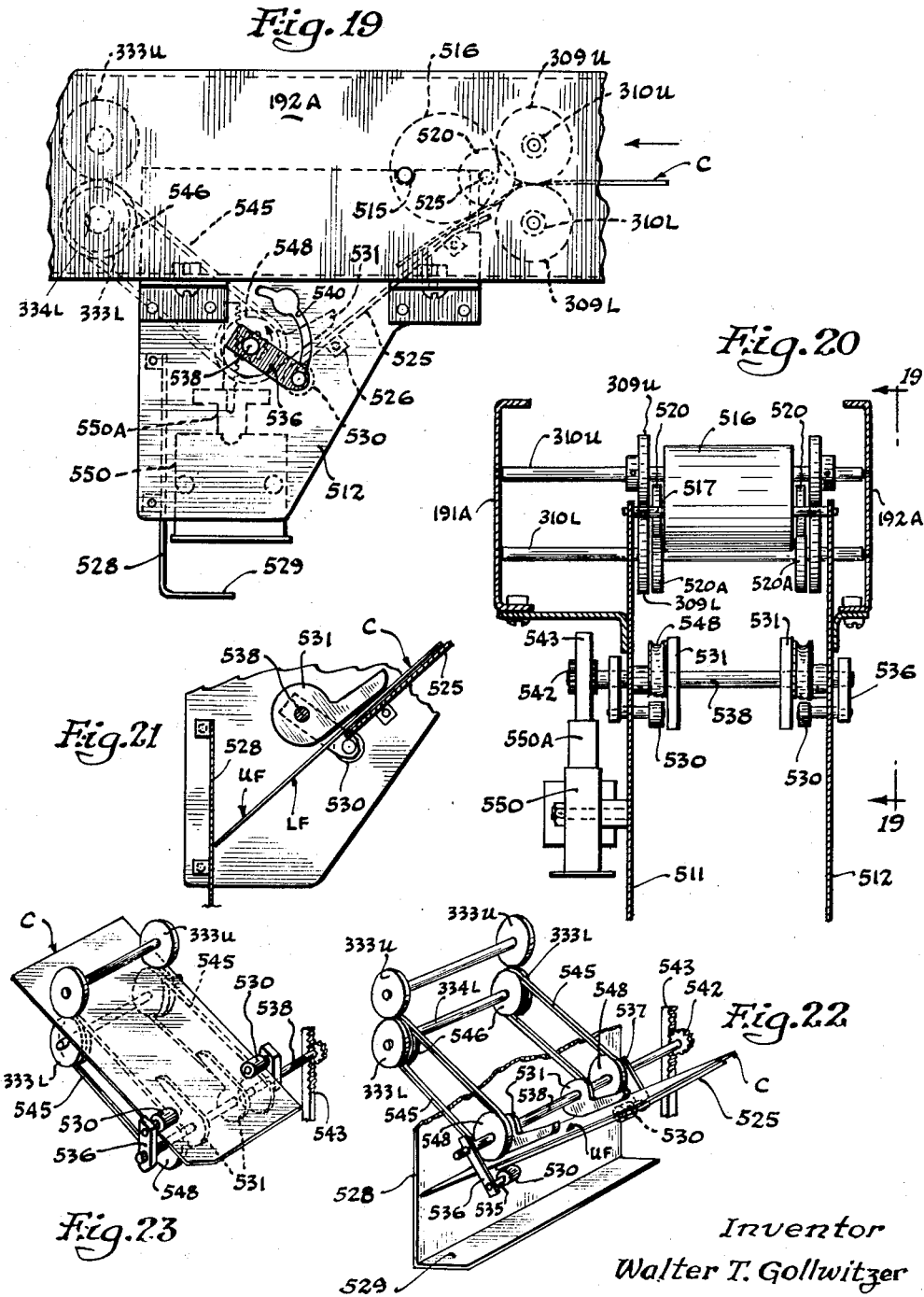
Inventor
Walter T. Gollwitzer
By Wallace and Cannon
Attorneys

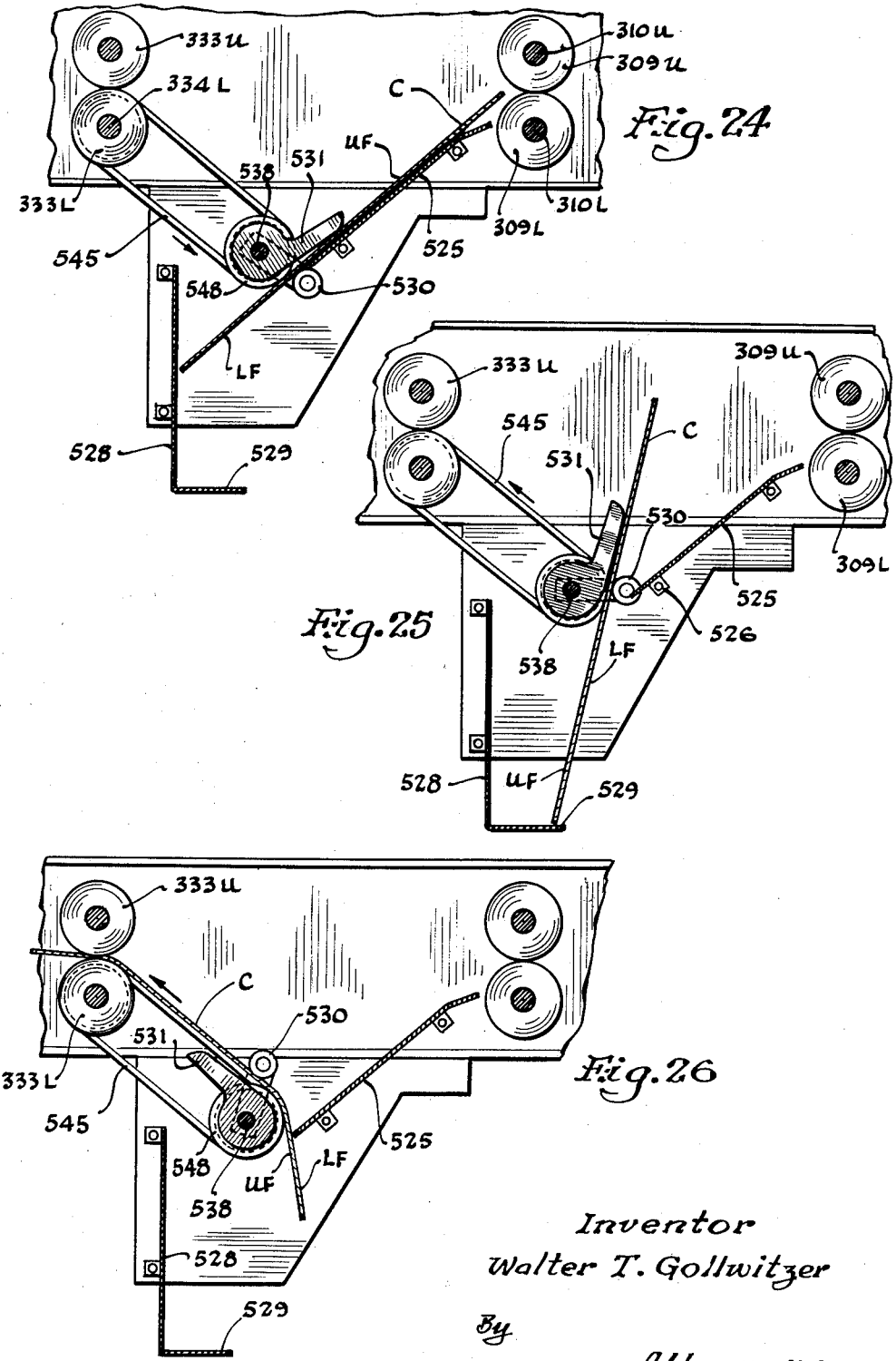

United States Patent Office 2,868,115
Patented Jan. 13, 1959

2,868,115

PRINTING MACHINES

Walter T. Gollwitzer, Euclid, Ohio, assignor to Addressograph-Multigraph Corporation, Wilmington, Del., a corporation of Delaware Application February 28, 1955, Serial No. 490,836

21 Claims. (Cl. 101—2)

This invention relates to a printing machine for producing business instruments.

In my application, Serial No. 201,102, filed December 16, 1950, now Patent No. 2,710,406, I have disclosed a printing machine for producing business instruments such as bills, checks, notices, and the like in the form of tabulating cards. The production of such business instruments in the aforesaid machine including the individual printing and punching thereof is under control of individual printing and control devices that are advanced one by one from a supply magazine first to a sensing station and from thence to a printing station. Such devices each include a frame having a printing plate carried thereon, and these printing plates are each provided with embossed type characters which are utilized at a printing station in the machine for printing the business instruments with data including numerical amounts and particularly names and addresses as well as other identifying data that may pertain to the persons or companies to which such printing devices are individually allocated. These same printing and control devices also each include an area on the frame adjacent the printing plate whereat there is provided physically represented information in the form of openings or the like punched therein in accordance with a predetermined code. This coded information on each printing and control device is sensed at the sensing station and is then relayed to a translator at a punching station in the machine having control over a set of punches which are thereupon set up for punching corresponding information in the form of openings in the business instrument that is allocated to the printing and control device which underwent sensing.

The business instruments that are thus to be produced under the control of the printing and control devices are stacked in an uncompleted form at one or more supply magazines in the machine, and in the production of these instruments the first operation entailed is that of feeding the tabulating cards to the aforementioned punch station where the cards are so positioned that certain areas thereof are provided with openings corresponding to the aforementioned physically represented information carried by the individual printing and control devices. After the punching of a tabulating card has been performed, the card is then passed to the printing station where a face thereof is printed by and from the type characters carried by the corresponding printing and control device, and with the completion of the printing and control device, and with the completion of the printing operation the card is then passed out of the machine to a collecting hopper.

Where the business instruments are produced having but a single order, as for instance, where all are of the order to be mailed, a single collecting hopper may ordinarily be used. However, it is often desirable not only to produce business instruments having a single order but also of other orders such as an extra copy, duplicate copies, and so on to be used for bookkeeping purposes such as tabulations or ledger entries pertaining to the business instruments that are to be mailed. To achieve such multiple order production of business instruments with a machine of the kind described in my aforesaid application, it is merely necessary to actuate certain of the controls described therein whereby two or more of the tabulating cards are passed through the machine for each of the printing and control devices used to control the punching and printing of the individual business instruments, and hence there may be produced in addition to cards of the order to be mailed, ledger cards of a second or higher order that are to be retained and used for bookkeeping purposes.

Therefore, where the aforesaid machine is to be used for such multiple order production of business instruments in the form of cards or the like, it is desirable that these be received from the printing station in the machine in such a way as to be sorted into the respective orders, and the attainment of this end by provision of a sorting means at a card receiving station in the aforesaid machine is the primary object of the present invention.

As noted hereinabove, the business instruments may be in the form of checks, such as dividend checks or like negotiable instruments, and to validate these it is necessary that the signature of the responsible party appear thereon, such as the signature of an officer of the corporation or the company drawing the checks. This may be readily accomplished by printing the signature of the aforesaid responsible party on the face of the tabulating card bearing the name and address of the payee, and a further object of the present invention is to enable such signature printing to be performed simultaneously with the sorting of the business instruments inclusive of such checks into the different orders, so that the aforesaid signatures appear at the proper place only on those instruments of the order representing checks that are to be mailed, such signatures not being printed on the instruments of the other order or orders that are to be retained only for the purpose of ledger entries or the like.

Where the business instruments to be mailed are in the nature of utility billings or the like, it is the usual procedure to print the date of the billing on the face of the instrument opposite that on which the name and address of the customer appear so that this date will be associated with the other data pertaining to the utility billing, such as meter readings, charges and the like. This, considered with the foregoing, makes it apparent that with one kind of business instrument that may be produced in the aforesaid machine a signature is to appear on the same face bearing the name and address of a payee, while in the case of business instruments of the other kind mentioned a date is to be printed on the face opposite that on which the name and address of a customer appear. A further object of the present invention is to enable printing means to be interchanged at the aforesaid card receiving station so that signatures may be provided on the business instruments of the one kind and dates provided on the business instruments of the other kind; and where it is the date that is thus to be printed, a further object of the present invention is to turn those business instruments which are to be mailed so that these will have the correct face thereof positioned for receiving the date, such turning to be accomplished simultaneously with sorting.

Further objects of the present invention are to enable various orders of business instruments to be handled in different ways so that each order is arranged in the desired way in a proper receiving hopper; to control the passage of business instruments to tandem receiving stackers by a deflector in turn controlled by controls in the machine that I have described in my aforesaid application; to enable this deflector to undergo alternate locking and releasing between successive business instruments; to enable business instruments which are to be printed while undergoing sorting to be momentarily halted and aligned in advance of the printing means so that accurate printing may be attained; and to enable business instruments, of the foregoing kind, advancing along a guideway to be deflected, turned over in a novel way and re-delivered back to the guideway.

Other and further objects of the present invention will be apparent from the following description and claims and are illustrated in the accompanying drawings which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

Fig. 1 is a perspective view of one kind of receiving station constructed along the lines of the present invention;

Fig. 2 is a plan view of the receiving station shown in Fig. 1 with certain parts being broken away;

Fig. 3 is a sectional view taken substantially on the line 3—3 of Figs. 2 and 4;

Fig. 4 is a sectional view taken substantially on the lines 4—4 of Fig. 2;

Fig. 5 is an end elevation of a card stacker taken on the line 5—5 of Fig. 4;

Figure 10:
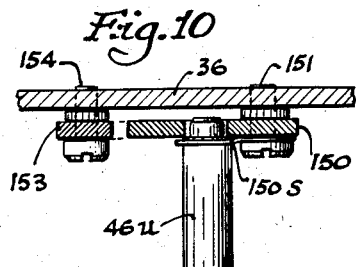
Figure 9:
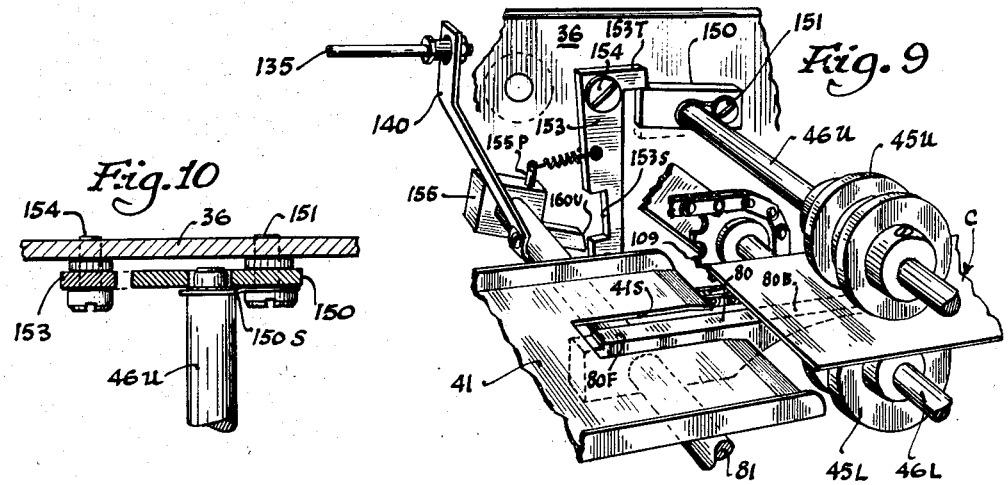
Figure 11:
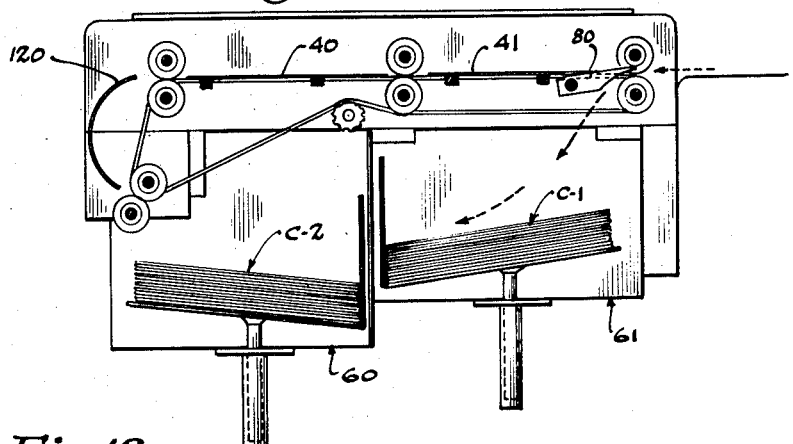
Figure 12:
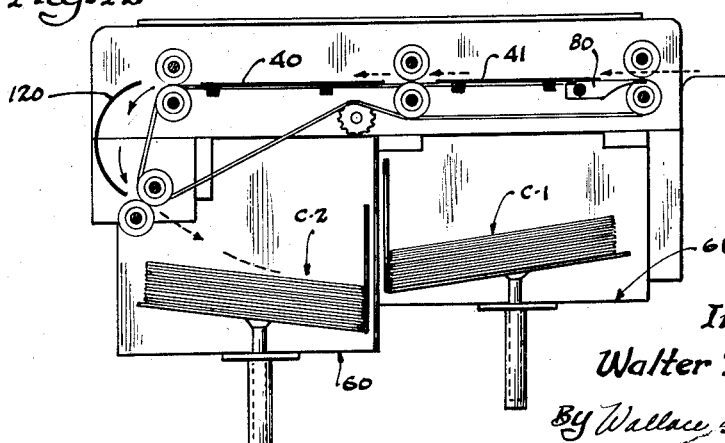

Figs. 6, 7, 8, and 8A are detail views on an enlarged scale showing various positions of the card deflector and the lock means associated therewith;

Fig. 9 is a detail perspective view, broken away, of the deflector and associated means;

Fig. 10 is a detail sectional view, broken away, of certain parts shown in Fig. 9;

Figs. 11 and 12 are diagrammatical views showing the way in which business instruments of different orders are handled at a receiving station;

Fig. 13 is a plan view of a modified form of receiving station;

Fig. 14 is a side elevation of the receiving station shown in Fig. 13;

Fig. 15 is a perspective view of still a further modified form of the invention;

Fig. 15A is a detail perspective view of certain drive means;

Fig. 16 is a schematic perspective view of the parts associated with the printing means;

Fig. 17 is a plan view of a clutch and the printing means controlled thereby;

Fig. 18 is a plan view taken on the line 18—18 of Fig. 17;

Fig. 19 is a side elevation of a card turn over means taken on the line 19—19 of Fig. 20;

Fig. 20 is a sectional view of the card turn-over means shown in Fig. 19;

Figs. 21, 22 and 23 are diagrammatic and schematic representations showing details of operation of the card turn over means;

Figs. 24, 25 and 26 are sectional views showing operation of the card turn-over means in successive stages;

Fig. 27 is a detail perspective view of a modified form of stop finger and pressure block; and Fig. 28 is a sectional view taken substantially on the line 28—28 of Fig. 27.

One form of the present invention is illustrated in Figs. 1 to 12 as embodied in a card receiving station 30 that is to be included in a machine M, Fig. 1, of the kind I have disclosed in my application Serial No. 201,102, filed December 16, 1950. As described in my aforesaid application, the machine as M is particularly adapted for the production of business instruments such as bills, checks, notices and the like in the form of conventional tabulating cards C, Fig. 1. The production of these cards in the machine M entails the punching and printing thereof at different stations, and when these operations are finished a feed belt identified as "202" in my aforesaid application as running on a pulley "203" is effective to feed the completed cards as C one by one out of the machine. This feed belt and pulley are also identified herein in Fig. 1, and it may be pointed out in this connection that each of the cards C passed out of the machine M by the feed belt 202 has had the lower face thereof at the machine M with data including a name and address enabling the cards to be mailed. This disposition of the printed face is of significance, since in some instances it is necessary to turn the cards in the receiving station for different purposes as will be described.

There may be provided at the receiving station a storage cabinet such as the one shown at CA, Fig. 14, and where such is provided it is convenient to also utilize this cabinet as a standard for the receiving station. This may be attained by affording supporting brackets such as those shown at 31 in Fig. 14, anchored to the top of the cabinet CA. As will be described hereinbelow, the receiving station includes card receiving hoppers 60 and 61, Fig. 4, and where a cabinet as CA is utilized the brackets 31 may be attached to the rear walls of such card receiving hoppers so that the cabinet CA serves in part as a standard for the receiving station as will be appreciated from the description to follow.

The receiving station 30 includes a guideway as will be described, and this guideway is supported between a pair of side panels 35 and 36 which extend in a horizontal outboard relation away from the machine M. The upper edges of these panels are turned inwardly to afford horizontal flanges as 36A for supporting a cover plate. The lower edges of the side panels 35 and 36 are likewise turned inwardly to afford bottom flanges 36F. At the ends of the side panels 35 and 36 which are adjacent the feed belt 202, there are end panels as 37, Fig. 4, suspended from the flanges 36F. These end panels afford a support for a horizontal bar such as the bar 37B, Fig. 14, having an opening therein through which a vertical tie bar such as the one shown at 37T, Fig. 14, may be passed and supported in a bracket such as the bracket 38 attached to the frame of the machine M. A lock screw is provided such as the lock screw 37L, Fig. 13, passed through the frame of the machine M and into a tapped opening in the bar as 37 to engage the vertical tie bar as 37T and lock the receiving station 30 rigidly to the machine M.

The side panels 35 and 36 are spaced apart by a plurality of transverse tie bars 39, Fig. 1, which at either end are anchored to the side panels, and fastened in tandem alignment on the upper faces of these bars are a pair of spaced apart horizontal guide plates 40 and 41 having the upper faces thereof in a common plane so as to afford a guideway for the cards C through the receiving station 30, the input end of this guideway being aligned with the output end of the guideway in the machine M where the cards C are emitted from the printing station therein by the feed belt 202. The two guide plates 40 and 41 include vertical flanges 42 at either side, and the spacing between these flanges is but slightly greater than the width of the cards C so that the latter pass along the guideway in the receiving station with but slight lateral play. At the ends thereof which face toward the input end of the receiving station, the flanges 42 on the plates are flared outwardly at 43, and there are downwardly inclined lips 44 at the leading edge portions of the guide plates 40 and 41, such assuring that the leading end of each card as C passing on to a guide plate is accurately positioned in the guideway.

At the end of the guide plate 41 adjacent the feed belt 202, Fig. 1, which is the input end of the receiving station 30, there are pairs of upper and lower in-feeding rollers 45U and 45L, respectively, having the bites thereof aligned with the upper face of the guide plate 41 and with the plane assumed by a card C emitting from the guideway in the machine M. The feed rollers 45U and 45L are respectively arranged on parallel upper and lower shafts 46U and 46L which extend transversely between the side panels 35 and 36, these shafts having a common vertical center line. One end of the lower shaft 46L is journalled in a bushing 48 mounted in the side panel 35, and the other end of this shaft is likewise supported in an inwardly extending bearing 49 mounted in the side panel 36. The ends of the upper shaft 46U are supported by means to be described below that afford a slight vertical play for this shaft to admit a card C being passed to the bite between the feed rollers 45U and 45L, and this is likewise true with respect to the other sets of feed rollers as will be described.

In this instance, the respective pairs of feed rollers 45U and 45L are located in side by side relation medially on the shafts 46U and 46L in position to pick up the leading end of each card C advanced out of the machine M by the feed belt 202, the vertical play of the upper shaft enabling this to occur. Thus, the rollers 45U and 45L are positioned to grip the opposite face of each card C at what constitutes the longitudinal medial portion thereof so that each such business instrument produced in the machine M may be advanced on to the input portion of the receiving station guideway afforded by the corresponding end of the guide plate 41. It will be borne in mind that the lower face of the cards C on the guide plate 41 is the one that was printed in the machine M with data including an address.

On the lower shaft 46L there is a spur gear 50, Fig. 2, and this gear is driven by a train of gears including a transmitting gear 51 and a drive gear 52 carried on a drive shaft 53. The transmitting gear 51 is rotatably supported at the lower end of an arm 56, Fig. 4, which at the opposite end is mounted on a pin 57 attached to the side panel 36. A spacer sleeve 58, Fig. 2, on the pin 57 locates the arm 56 so that the transmitting gear 51 is meshed with the spur gear 50. The drive gear 52 is meshed with the transmitting gear 51, and the drive shaft 53 may be driven by a suitable drive connection to the main drive motor for the machine M. In this manner, the lower pair of feed rollers 45L are driven constantly in a counterclockwise direction as viewed in Fig. 4, and inasmuch as the lower feed rollers 45L normally engage the upper feed rollers 45U, the latter are driven in a clockwise direction so as to advance business instruments as the cards C received from the machine M forwardly on to and along the guide plate 41.

Included in the receiving station 30 are a pair of card receiving hoppers 60 and 61, Fig. 4, arranged in tandem beneath the receiving station guideway so that the hopper 61 in this instance represents what may be termed the first one. The two hoppers utilized in this instance correspond to two orders of business instruments that may be produced in the machine M. As will be set forth in more detail below, those business instruments of the order to be mailed are directed in to the second hopper 60, while the business instruments of the order to be retained at the office for bookkeeping purposes such as ledger entries are to be directed in to the first hopper 61.

The hoppers 60 and 61 may be conveniently stamped from sheet metal so as to include end walls 65 and 66, and the spacing between these end walls is such as to be of the order of the longer dimension of the business instruments. The hoppers 60 and 61 are open at the front as shown in Figs. 1 and 4 to enable the cards as C received therein to be removed, and the back of each hopper is closed by a rear wall as 68, Fig. 4. The hoppers 60 and 61 may be suspended in tandem below the receiving station guideway by different means, and one way in which this may be accomplished is that shown in Fig. 4 where angle brackets as 69 are attached to the flange 36F of the side panel 36 at points opposite the rear walls 68 of the receiving hoppers. The lower extents of these brackets are bent inwardly so as to receive fastening screws as 69S passed through the rear walls 68 of the receiving hoppers, and in this manner the hoppers 60 and 61 are spaced directly below the respective guide plates 40 and 41.

The hoppers 60 and 61 are, of course, open at the top, and being relatively light in weight, suspension thereof may alternatively be had from the cross bars 39 which space the side panels 35 and 36, this type of suspension being the one used for the hoppers shown in Figs. 13 and 14 as will be described.

Arranged yieldably in the hoppers 60 and 61 are stackers 70 and 71. Each such stacker includes a bottom plate 73 on which the cards C of the respective orders are to be stacked vertically, and at one end of each bottom plate is a vertical stop plate 74. The stackers are so disposed in the respective hoppers 60 and 61 that the stop plates 74 thereof catch in each instance what are the leading ends of the cards C entering the hoppers, the direction in which the cards of the respective order enter the hoppers being set forth below.

The stackers 70 and 71 are spring supported as is well known in the art so that as successive business instruments stack up on the bottom plates 73 the stackers gradually lower. Thus, there is attached to the medial portion of the bottom face of each stacker plate 73 a tubular standard 75 which is telescoped into a mounting socket 76 supported by a bracket 77 having a vertical flange attached to the outer face of the rear side wall 68 of each hopper as shown in Fig. 4. Mounted in the sockets 76 are expansion springs 78 bearing on the lower ends of the standards 75, these springs being effective to position the stackers 70 and 71 normally in elevated position in the receiving hoppers 60 and 61. Preferably the bottom plates of the stackers 70 and 71 are tilted downwardly and inwardly so that the cards C when stacked are tilted downwardly in the direction of the end plates 74 and inwardly toward the rear walls 68 of the hoppers.

The cards C which are of the order to be mailed are directed to the second or mailing hopper 60 in a way which will now be described.

The input end of the guide plate 41 is slotted longitudinally at 41S, Fig. 2, and arranged in this slot is a deflector finger 80 which normally is in a released position so that the upwardly disposed face 80F, Fig. 9 thereof lies in the plane that is common to the guide plate 41 and the bight between the upper and lower feed rollers 45U and 45L. The deflector finger 80 is carried on a rock shaft 81 which is adapted to elevate the deflector finger above the aforementioned plane in a way to be described below, this action being utilized only in connection with those cards which are to go in to the first or ledger hopper 61. However, inasmuch as the deflector finger 80 is normally in released position, a business instrument as C advanced from the machine M to the receiving station 30 will be in-fed by the feed rollers 45U and 45L across the top of the released finger 80 and forwardly along the guide plate 41. Located between the spaced apart ends of the guide plates 40 and 41 are a pair of side by side upper feed rollers 85U normally engaging a pair of lower feed rollers 85L so that the bite therebetween is aligned with that of the in-feeding rollers 45U and 45L. The rollers 85U and 85L are further positioned so that the leading end of a card C passing from the guide plate 41 is forced in to the bite of the rollers 85U and 85L by the feed rollers 45U and 45L in-feeding the trailing end of this card.

The lower feed rollers 85L are carried on a shaft 86L, and one end of this shaft is carried in a bushing 87 mounted in the side panel 35 as shown in Fig. 1. The other end of the shaft 86L is rotatably supported by an inwardly extending bearing 88 mounted in the side panel 36. The upper set of feed rollers 85U is carried on a shaft 86U that is parallel to and on vertical center line with the lower shaft 86L. The upper shaft 86U is arranged for slight vertical play so that the pair of feed rollers carried thereby will be relieved from engagement with the lower feed rollers 85U to admit a card in-fed by the rollers 45U and 45L. In the present instance, such vertical play of the upper shaft 86U is attained by rotatably supporting one end thereof in an arm 90, Fig. 1, pivoted on an inwardly extending pin 91 attached to the side panel 36. A torsion spring 95 is anchored to the pin 91, and the free end of this spring is tensioned on the shaft 86U. In this manner, the spring 95 tends to yieldably hold the upper rollers 85U firmly in engagement with the lower rollers 85L. Hence, as the in-feeding rollers 45U and 45L are effective to force the leading end of a card C into the bite between the feed rollers 85U and 85L, the upper set of rollers 85U yields to admit the card. This yielding action of the upper rollers 85U is but slight, being merely that of the thickness of the card C, and the end of the shaft 86U opposite the arm 90 is supported in the side panel 35 to enable this slight play to occur.

At the end of the guide plate 40 away from the feed rollers 85U and 85L are respective pairs of upper and lower feed rollers 100U and 100L carried in side by side relation on parallel upper and lower shafts 101U and 101L having a common vertical center line. One end of the lower shaft 101U is rotatably supported in a bushing 102 mounted in the side panel 35, and the opposite end of this shaft is rotatably supported in an inwardly extending bearing 103 attached to the side panel 36 as shown in Fig. 1. The positioning of the shafts 101U and 101L is such that the bite between the rollers 100U and 100L is in the plane of a card C on the guide plate 40, so that the leading end of such a card is in-fed to the bite thereof by the rollers 85U and 85L engaging the trailing end of this card.

One end of the upper shaft 101U on which the upper feed rollers 100U are carried is supported by an arm 90A journalled at one end on a pin as the arm 90 described above. A torsion spring 95A acts between the pin on which the arm 90A is pivoted and the shaft 101U so that the rollers 100U yieldably engage the lower feed rollers 100L. The end of the upper shaft 100U opposite the arm 105 is supported in the side panel 35 for the amount of vertical play corresponding to that required to admit a card as C.

The lower feed rollers 85L and 100L are in each instance constantly rotated in a counterclockwise direction as viewed in Fig. 4 by a chain 108 that is driven by a sprocket 109, Figs. 2 and 9, carried by the shaft 46L which is adjacent the input end of the receiving station 30, and it will be recalled that this shaft 46L is driven constantly by the aforementioned gear train. There is a sprocket 110, Fig. 1, carried by the shaft 85L, this sprocket being aligned with the drive sprocket 109. The two passes of the chain 108 are parallel in the portion between the sprockets 109 and 110 so that the latter sprocket is engaged by both passes of the chain 108, as can be seen in Fig. 4. There is likewise a sprocket 112, Fig. 1, on shaft 101L in alignment with the sprockets 109 and 110, and the chain 108 is directed downwardly about the sprocket 112 to a sprocket 115, Fig. 4, and from thence upwardly to an idler sprocket 116 and back to the drive sprocket 109. The idler sprocket 116 is positioned to tension the chain 108 in the pass between the sprockets 110 and 115, and such is attained by rotatably supporting the idler sprocket 116 at the upper end of an upwardly inclined arm 117 which may be adjustably attached to the rear wall of the hopper 60 as shown in Fig. 4. The upper feed rollers 85U and 100U being normally engaged with the lower feed rollers that are paired therewith, will rotate clockwise as viewed in Fig. 4.

Mention was made above of the fact that the business instruments produced in the machine M have one face thereof printed with a name and address, this face being the one disposed downwardly on the guideway afforded by the guide plates 40 and 41. Inasmuch as it is sometimes desirable that such printed face of the cards C which are of the order to be mailed be revealed for inspection, a reversing chute 120 is arranged in this instance at the output side of the feed rollers 100U and 100L. This chute 120 is arcuate in nature with the concave side 120C thereof facing inwardly in the direction of the mailing hopper 60, and the convex face has fastened thereto U-shaped brackets as 121 through the openings of which are passed a pair of supporting bars 122. The upper one of these supporting bars is anchored at either end to the side panels 35 and 36 as shown in Fig. 1, and the ends of the lower one of the supporting bars 122 are anchored to respective depending panels 123 and 124 having inwardly turned flanges as 124F at the upper edges thereof which are fastened to the lower flanges 36F of the side panels 35 and 36 as by mounting bolts 125, Fig. 1.

The reversing chute 120 is positioned so that the upper extent thereof forms a back-stop for a mailing card passing from the feed rollers 100U and 100L, and accordingly as these rollers are effective to pass a card C to the chute 120 this card is gradually turned in a counterclockwise direction as seen in Fig. 4. Aligned with the lower end of the reversing chute 120 are pairs of upper and lower engaged feed rollers 125U and 125L carried on respective parallel shafts 126U and 126L that are journalled in the panels 123 and 124, but in this instance the center line of the two shafts 126U and 126L is at an angle with the vertical so as to dispose the bite of the corresponding feed rollers in the turning path of a card as C being forced downwardly along the reversing chute by the feed rollers 100U and 100L. The sprocket 115, Fig. 4, is carried by the upper shaft 126U so that the feed rollers 125U are driven counterclockwise as viewed in Fig. 4, and the lower feed rollers 125L being normally engaged therewith rotate clockwise.

As in the case of the other feed rollers at the receiving station 30, the feed rollers 125U and 125L are arranged as pairs in side by side relation at medial portions of the shafts 126U and 126L so that at all times it is the medial portion of each business instrument passed to the mailing hopper 60 that is engaged by the feed rollers thus far described.

The feed rollers 125U and 125L are so positioned with respect to the chute 120 that the leading edge of a mailing card being turned face for face in the chute 120 enters the bite between these rollers prior to the trailing end thereof passing beyond and out of the bite between the feed rollers 100U and 100L, the shaft 126U being supported for play away from the shaft 125L to enable the feed rollers 125U and 125L to be relieved of engagement one with the other when a card is fed thereto. Since such action is attained by means as the arms 90 and 90A described above, the details of this need not be further described.

As was noted hereinabove, there is a deflector finger 80 arranged in a slot 41S at the end of the guide plate 41, this being most clearly shown in Fig. 9. This finger is adapted to direct those of the cards which are of the ledger order into the hopper 61 as will now be described.

The deflector finger 80 is fast at one end on a rock shaft 81 pivotally supported in and between the side panels 35 and 36 as shown in Figs. 2 and 4 just below the guide plate 41, and the arrangement is such as to accurately align the upper edge of the blade 80B with the bite between the in-feeding rollers 45U and 45L, this being representative of the normal position of the deflector finger whereat those cards C of the order to be directed to the mailing hopper 60 are in-fed forwardly along the upper face of the blade 80B on to the guide plate 41.

Figure 6:
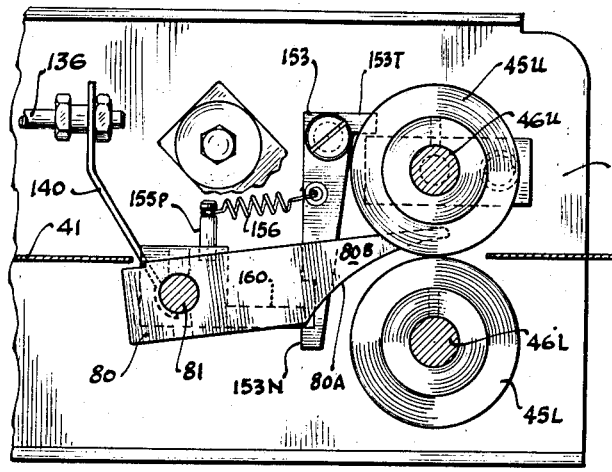
Figure 8:
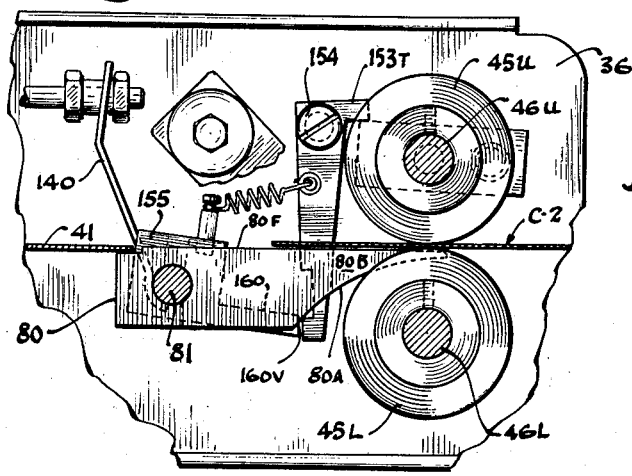

The deflector 80 is adapted to be elevated as shown in Fig. 6, from the normal or release position, Fig. 8, under the control of a normally deenergized solenoid 130, Figs. 1 and 4, supported in a housing 131 attached on the side panel 36. As described in my aforesaid application, there is a main cam shaft in the machine M having a plurality of timing cams arranged in tandem thereon adapted in different portions of a cycle of operation to actuate many of the control switches included in the circuit of the machine. In the present instance, one such cam controlled switch is allocated to the solenoid 130 and timed so that the solenoid 130 is energized just prior to the time a card as C-1, Fig. 6, which is of the ledger order is ready to enter the bite between the rollers 45U and 45L.

Figure 7:
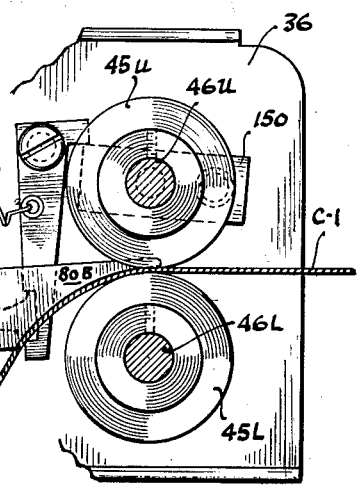

The solenoid 130 includes an armature 135 which when the solenoid is energized as aforesaid is pulled in the direction of the card reversing chute 120. Attached to the armature is a relatively long control link 136 that extends along the inner wall of the side panel 36 toward the deflector finger 80, and at the end opposite the armature 135 this link is attached to the upper end of a vertical lever 140, Figs. 4 and 9, which at the lower end is fastened to the rock shaft 81. Hence, when the solenoid is energized, the rock shaft 81 is pivoted counterclockwise as viewed in Figs. 6 to 8, and this elevates the deflector finger 80 in the slot 41S so that the arcuate lower face 80A of the blade 80B blocks off the receiving station guideway. Accordingly, as the feed belt 202, Fig. 1, is effective to force the leading edge of the card C-1, Fig. 6, through the bite of the rollers 45U and 45L, the arcuate lower face 80A of the deflector 80 bends the leading end portion of the card C-1 downwardly as shown in Fig. 7 so that this card is passed to the stacker 71 with the face thereof that was printed in the machine M disposed downwardly.

Inasmuch as it is necessary that the deflector finger 80 be elevated by the solenoid 130 prior to a card as C-1 of the ledger order being fed to the rollers 45U and 45L, it is desirable that a means be afforded to releasably hold the deflector finger 80 in an elevated position. Thus, a releasable lock or holding device is associated with the means affording vertical play for the shaft 46U on which the upper feed rollers 45U are carried as will be described, the arrangement further being such that a card as C-1 passing into the bite between the rollers 45U and 45L releases or opens the lock so that the deflector finger 80 is automatically conditioned to assume its normal released position after the card as C-1 has passed beyond the in-feeding rollers.

As best shown in Figs. 9 and 10, one end of the upper shaft 46U is supported at the medial portion of an arm 150 which is pivoted at one end on a pin 151 extending inwardly from the side panel 36. The arrangement is similar to the arms as 90 and 90A described above, and thus it will be observed that a torsion spring 150S is anchored to the pin 151. The free end of this spring bears on the shaft 46U to yieldably hold the upper feed rollers 45U down on the lower rollers 45L paired therewith. At the end opposite the pin 151, the arm 150 is engaged by a horizontally projecting toe 153T at the upper end of a vertical arm or trigger 153 that is pivoted on an inwardly extending pin 154 attached to the side panel 36.

On the end of the rock shaft 81 that is adjacent the side panel 36, there is a finger or tumbler 155 fixed thereto, and on the upper side of this finger is a pin 155P on which is anchored a trigger spring 156 which at the opposite end is tensioned on the trigger 153 below the pivot 154 therefor so as to tend to turn the toe 153T thereof clockwise as viewed in Fig. 9 against the arm 150. Hence, when the leading end of a card as C-1, Figs. 6 and 7, is passed into the bite of the rollers 45U and 45L, the upper shaft 46U yields as enabled by the torsion spring 150S to admit the in-fed card, the end of the shaft 46U opposite the trigger 153 being supported in the side panel 35 of this slight vertical play as in the case of the other ones of the upper feed roller shafts that were described above.

Figure 8A:
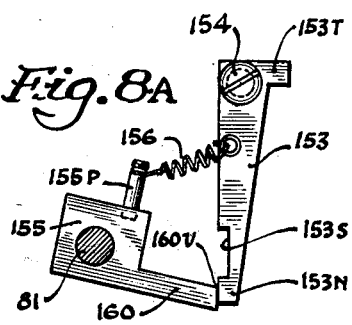

The finger 155 on which the trigger spring 156 is anchored serves to hold the deflector finger 80 locked in an elevated position, such being accomplished by forming the finger with a catch 160 at the lower end thereof projecting in the direction of the trigger 153. The free end of the catch 160 is formed with a chamfered face 160V, Figs. 8 and 9, and when the deflector finger 80 is normally in released position with no card between the feed rollers 45U and 45L the chamfered end 160V of the catch 160 engages a nose 153N at the lower end of the trigger arm 153 as shown in Fig. 8A. Spaced above the nose 153N at the lower end of the trigger arm 153, there is a sear notch 153S, Figs. 4 and 9, formed in the edge of the trigger that faces the catch 160 on the tumbler.

When the solenoid 130 is energized as described above to turn the rock shaft 81 counterclockwise which is the condition shown in Fig. 6, the chamfered face 160V of the catch 160 passes upwardly along the nose 153N at the lower end of the trigger, pivoting the trigger slightly counterclockwise on the pin 154 against the action of the trigger spring 156 until finally the catch 160 enters the sear notch 153S, whereupon the trigger spring 156 is effective to return the trigger 153 in a clockwise direction with the chamfered end 160V of the catch 160 seated in and held by the sear thus locking the deflector finger 80 in an elevated position as shown in Fig. 6. Such travel of the chamfered end 160V of the catch 160 along the nose 153N of the trigger occurs, as was noted above, just prior to the time the leading end of the ledger card as C-1 enters the bite between the rollers 45U and 45L, and when the ledger card as C-1 is in-fed by the belt 202 to the rollers 45U and 45L the upper shaft 46U yields and the arm 150 assumes the tilted attitude shown in Fig. 7. This triggers the finger 155 as shown in Fig. 7, because the proportioning of the lock is such that clockwise triggering movement imparted to the arm 150 by the entrance of the card C-1 in to the bite between the rollers 45U and 45L retracts the sear notch 153S from the chamfered end of the catch 160. The solenoid 130 in the meantime has been deenergized as will be noted by comparison of the positions for lever 140 in Figs. 6 and 7, and consequently as the trailing end of the card C-1 passes beyond the bite of the rollers 45U and 45L and on to the stacker 71, the deflector finger 80 collapses to its normal released position shown in Fig. 8. Accordingly, the next card C-2, Fig. 8, following the card C-1, being of the order to be mailed, rides along the upper face 80F of the deflector finger inwardly toward the guide plate 41 since, of course, the solenoid 130 is energized only for the ledger cards as C-1 passed from the machine M.

The above conditions corresponding to the two orders of business instruments represented by the different ordered cards C-1 and C-2 are depicted diagrammatically in Figs. 11 and 12. Thus, the deflector finger 80 when in the actuated or elevated position shown in Fig. 11, blocks off the guideway afforded by the guide plates 40 and 41 so that the arcuate lower edge thereof directs the ledger cards C-1 in to the ledger hopper 61. When, however, the deflector finger 80 is in the released or normal position shown in Fig. 12, the mailing cards C-2 are advanced forwardly through the card receiving station guideway and at the end of this guideway are turned face for face by the reversing chute 120.

It will be apparent from the foregoing that between successive ones of the ledger cards and mailing cards C-1 and C-2 respectively, the deflector finger 80 undergoes alternate actuation and releasing. The cards as C-1 and C-2 are of course supplied to the machine M in an incomplete form as from separate supply magazines arranged as I have shown in my aforesaid application. In this instance, then, the arrangement is such that the cards C-1 which are of the ledger order are first punched and printed followed by the punching and printing of the cards C-2 which are of the mailing order, punching and printing of each pair of cards C-1 and C-2 being under the control of a single one of the printing and control devices mentioned above. Accordingly, the cam controlled switch on the main cam shaft in the machine M which controls the solenoid 130 is timed with respect to the ledger card C-1 fed out of the machine M by the belt 202 so that the deflector finger 80 is elevated to direct this ledger card into the ledger hopper 61 as described above, passage of such a ledger card through the rollers 45U and 45L automatically releasing the deflector finger so that the mailing card C-2 which immediately follows the ledger card C-1 is directed forwardly through the receiving station guideway to the chute 120 where such mailing card is turned face for face as it passed into the mailing hopper 60.

There are instances where, in the production of ness instruments with the machine of my aforesaid application, it is desirable that there be produced a multiple number of ledger cards for each of the business instruments that is to be mailed. In Figs. 13 and 14 there is shown a receiving station 170 adapted for sorting triplicate rather than duplicate ordered cards as C in to respective receiving hoppers 180, 181, and 182, Fig. 14. Thus, the hopper 180 is arranged to receive business instruments of the order to be mailed, the hopper 181 is adapted to receive one ledger card and the hopper 182 is arranged to receive the second ledger card. These hoppers are each afforded by a sheet of metal bent to afford a rear wall 185 and an end wall 186, Fig. 13, arranged to neatly accommodate the dimensions of the cards C within the respective receiving hoppers.

The receiving station 170 includes a pair of relatively long side panels 191 and 192 having inwardly turned flanges as 191F at the upper edges thereof on which a cover flange for the receiving station may be set. Spacing the side panels 191 and 192 are a plurality of spacer bars 193 anchored at either end to the respective side panels, and these same spacer bars may be utilized to suspend the receiving hoppers in tandem relation below the guideway for the cards as C through the receiving station 170. Thus, as shown in Fig. 14, the rear walls 185 of the receiving hoppers include upwardly extending portions 185A formed at the top edge with inwardly turned flanges 185F adapted to be bolted at spaced points to the tie bars 193 as shown in Fig. 13.

At the ends of the side panels 191 and 192 which correspond to the input end of the receiving station 170 there are vertical panels as 37A, Fig. 14, serving to afford a rigid connection to the frame of the machine M as was described above in connection with the receiving station 30.

In each of the three receiving hoppers there is a yieldably supported stacker 210, 211 and 212, respectively, and these stackers include tubular standards 214 telescopically mounted in sockets 215 that are suspended from the rear walls of the hoppers by supporting brackets 216, this arrangement being identical to that described above in connection with the receiving station 30. Disposed in the sockets 215 are coil springs as 216 bearing against the lower ends of the standards 214 serving to support the respective stackers yieldably within the respective hoppers.

Arranged in tandem alignment lengthwise of the receiving station 170 are, in this instance, three guide plates 221, 222, and 223, Fig. 13. These three guide plates are supported on the upper faces of the cross bars 193 and are formed at either side with vertical lips 224 serving to afford a guideway through the receiving station 170 for confining the shorter dimension of the business instruments passed therethrough so that these have but a slight amount of lateral play.

The completed business instruments are emitted from the printing station in the machine M by the feed belt 202, Fig. 13, such that this feed belt passes the leading end of a card C to the bite afforded by a pair of engaged upper and lower feed rollers, the upper of these rollers, 230U, being shown in Fig. 13. As shown in Fig. 13, the in-feeding rollers in this instance are carried in spaced apart relation on corresponding parallel upper and lower shafts 231U and 231L, Fig. 14, having a common vertical center line.

The guide plates 221, 222 and 223, have the adjacent ends thereof spaced apart on the cross bars 193 as shown in Fig. 13 enabling other vertically paired feed rollers to be rotatably mounted in the spaces thus afforded with the bites thereof aligned with the plane of the guideway, the arrangement preferably being such that the leading end of a card to be passed along the guideway is gripped by one set of feed rollers before the trailing end thereof passes beyond the next rearward set.

Thus, as shown in Fig. 13, there are three shafts 235, 236 and 237, mounted transversely between the side panels 191 and 192 where the adjacent ends of the guide plates are discontinuous. Spaced apart on each of these shafts are pairs of upper feed rollers 238, 239, and 240, respectively, that are aligned with the upper ones of the in-feeding rollers 230U, and engageably paired with the rollers 238, 239 and 240 therebelow are other rollers (not shown) likewise arranged in spaced apart relation on lower shafts 235A, 236A and 237A having respective vertical center lines aligned with the upper shafts 235, 236 and 237. The ends of the two shafts 235 and 236 which are adjacent the side panel 191 are each supported in an arm 243, Fig. 14, that is pivoted on an inwardly extending pin attached to the side panel 191, and since this arrangement is in the nature of that described above in connection with the receiving station 30, further description in this regard is unnecessary. Thus, torsion springs as 95 and 150S described above are associated with the arms as 243, and these are effective to yieldably hold the rollers 238 and 239 against the paired rollers therebelow. The ends of the shafts 235 and 236 opposite the arms as 243 are supported in the side panel 192 for the amount of vertical play corresponding to the thickness of a card as C. The way in which the shafts 231U and 237 carrying the feed rollers as 230U and 240, respectively, are arranged for such vertical play will be described below.

The three sets of feed rollers that are forward of the rollers 230U are driven by a chain (not shown) passed about sprockets 255, 256 and 257 respectively carried on the lower shafts 235A, 236A and 237A. Intermediate these sprockets are idlers as 258, Fig. 13, serving to support the passes of the chain afforded for the sprockets 255, 256 and 257. Certain of these idlers may be rotatably carried on brackets as 259 attached to the cross bars 193, and others of the idler sprockets may be journalled on stub shafts as 260 mounted, for instance, in the side panel 191. A drive sprocket 261 is carried on the shaft 231L at the input end of the receiving station 170, and this shaft is driven by a train of gearing 50A, 51A and 52A which is similar to the train of gearing described above in connection with the receiving station 30, the gear 52A in this instance being carried on a shaft 53A adapted to be driven by suitable drive connection to the main drive motor of the machine M.

As was noted hereinabove, the hopper 180 represents the mailing hopper so that the business instruments as the cards C which are of the order to be directed into this hopper travel the length of the guideway afforded by the plates 221, 222 and 223 until the leading end thereof is passed into the bite of the feed rollers carried by the shafts 235 and 235A at the end of the guide plate 221. Inasmuch as it is not necessary that the mailing cards in every instance be turned to reveal the printed face thereof for inspection, the mailing hopper 180 in this instance is arranged to receive the mailing cards with the printed face down as viewed in Fig. 14 which is the condition in which these cards are passed off the guide plate 221. To enable this relation to be attained, a deflector in the form of an upwardly inclined plate 265 is attached to the cross bar 193 which is to the left of the feed rollers 238 as viewed in Fig. 14 to deflect the leading end of each mailing card passing beyond the feed rollers 238 into the mailing hopper 180.

Since there are duplicate ledger cards produced in this instance, these must be arranged in the respective ledger hoppers 181 and 182 in the proper sequence. Thus, in the instance where business instruments of a triplicate order are to be handled, the controls for the machine M are set to punch and print first one ledger card, to punch and print next a second ledger card and finally to punch and print the mailing card, the three cards in each such set being produced, of course, under the control of a single printing and control device. It is therefore desirable for every set of three business instruments thus produced that the first ledger card enter the hopper 182, the second ledger card enter the hopper 181 and the mailing card enter the hopper 180. Such relations are achieved by deflecting fingers 271 and 272, Fig. 14, which are under the control of a common solenoid as will be described. Since the feed rollers in this instance are spaced apart as shown in Fig. 13 on the several shafts rather than in side by side relation as in the receiving station 30, it is preferable that the deflector fingers 271 and 272 be arranged as pairs inwardly of the bites between the feed rollers with which these deflector fingers are associated. Thus, there are a pair of deflector fingers 272 associated with the stacker 212, and these deflectors are arranged inwardly of the rollers 230U on a rock shaft 278, Fig. 13, supported between the side panels 191 and 192 below the end portion of the guide plate 223 which is adjacent the feed rollers as 230U.

Likewise, the deflector fingers 271 associated with the stacker 211 are carried on a rock shaft 279 supported transversely between the side panels 191 and 192 below the end of the guide plate 222 adjacent the feed rollers 240, and these deflectors on the shaft 279 are located just inwardly of the rollers as 240. The deflectors 271 and 272 extend back beyond the edges of the guide plates 222 and 223 which face toward the input end of the receiving station, and at these portions the guide plates are each slotted as at 275, Fig. 14, to enable the deflectors to be elevated above the planes of the guide plates 222 and 223. At either end of the rock shafts 278 and 279 adjacent the side panel 191 there are respective levers 281 and 282 fixed thereon which extend upwardly, and when these levers are pulled simultaneously to the left as viewed in Fig. 14 the deflector fingers 271 and 272 on the respective rock shafts are elevated from normal position aligned with the bites of the feed rollers with which they are respectively associated to simultaneously block off the guide plates 222 and 223. In the present instance, the deflector fingers 271 and 272 are elevated simultaneously by attaching the upper ends of the levers 281 and 282 to a common control link 285 which at one end is connected to the armature 286A of a solenoid 286 mounted inboard on the side panel 191. Thus, when the solenoid 286 is energized, the armature 286A is retracted and the respective deflector fingers 271, 272 are elevated simultaneously.

When elevated, the deflector fingers as 271 and 272 are locked in elevated position. Thus, there is a lock for each of the deflector fingers 271 and 272 including a depending arm or trigger as 290 pivoted on the side panel 191 and a finger or tumbler 291 carried on each of the rock shafts 278 and 279 having a catch 291C adapted to be held by a sear notch at the lower end of each arm 290. Since these locks are each identical to the lock shown in Figs. 6 to 9, it is unnecessary to redescribe in detail the operation thereof other than to point out that the finger 291 on each of the rock shafts 278 and 279 is held up by the corresponding trigger 290 when the solenoid 286 is energized, such triggers each having a toe thereon tensioned on an arm 293 in which the shafts 231U and 237 are journalled, serving in part to afford vertical play for the upper shafts 231U and 237 as was described in connection with the in-feeding rollers of the receiving station 30.

Actuation of the solenoid 286 is timed by the controls in the machine M so that both sets of deflector fingers 271 and 272 are locked in elevated position by the time the first ledger card is passed to the in-feeding rollers including the upper feed rollers 230U. Accordingly, as the first ledger card passes into the in-feeding rollers, the arcuate lower edges of the first set of deflector fingers 272 in elevated position block off the guideway in the receiving station 170, and this first ledger card is turned down toward the stacker 212.

As the first ledger card passed into the bite between the in-feeding rollers, the lock for the deflector fingers 272 was released or triggered by this card lifting the upper feed rollers 230U aaginst the tension on the pivotal arm as 293 which thereupon retracted the sear of the trigger away from the catch 291C on the tumbler finger as 291 associaetd therewith. When the trailing end of the first ledger card passed beyond the in-feeding rollers as 230U, the deflector fingers 272 assumed their normal released position so that the second ledger card to be passed in to the receiving station 170 will be in-fed forwardly along the first guide plate 223 toward the deflector fingers 271, which, of course, are still locked in elevated position. The deflector fingers 271 thus being locked in elevated position, the arcuate lower edges thereof direct this second ledger card down on to the stacker 211, and as the trailing end of the second ledger card passes beyond the feed rollers as 240 associated with the deflector fingers 271, the latter, having been unlocked by the leading end of the second ledger card passed to the rollers as 240, are released to normal position so that the mailing card which next follows in sequence will pass through the receiving station guideway all the way to the deflector plate 265 adapted to direct this card down in to the mailing hopper 180.

As was outlined above, there are instances in the production of business instruments in the machine of my aforesaid application where a signature is to be applied to the face of each card which is to be mailed, this face being the one that was printed in the machine M with a name and address and which is disposed downwardly while traveling along the receiving station guideway between the side panels 191 and 192. The ledger cards are, of course, to receive no such signature, and accordingly signature printing in accordance with the present invention is to be performed just prior to the mailing card being directed in to the mailing hopper 180.

Thus, as shown in Fig. 13, the guide plate 221 which is beyond the hoppers 181 and 182 for the two cards which are of the ledger order includes an opening 221A therein enabling a printing means to be disposed below the guide plate 221 so as to imprint the bottom face of a mailing card passing over the opening 221A in the guide plate 221. As will be described, a platen is disposed over the opening 221A in the guide plate 221 to support the back of the card being printed. Another opening, 221B, is afforded in the guide plate 221 in advance of the opening 221A, and this opening is to receive a sensing finger disposed therein in position to detect the passage of a mailing card on to the guide plate 221 beyond the feed rollers 239. Anchored to the side panel 192 is a mounting plate 295 which serves to support the printing means as will be described below in connection with further modifications of the card receiving station of the present invention.

In Fig. 15, the receiving station 170A there shown represents a modification of the receiving station 170, the receiving station 170A in this instance being adapted to handle either one or two ledger cards and in addition to print each card to be mailed with a signature on the face thereof that was provided with a name and address in the machine M. Thus with respect to the receiving station 170A there will be described in detail merely the differences in general operation that prevail with respect to the receiving station 170.

The business instruments emitting from the machine M that is shown in Fig. 1 are first passed to in-feeding rollers at the input end of the receiving station 170A, these rollers including a pair of upper rollers as 300U arranged in spaced apart relation on a shaft 301U so as to normally engage a corresponding pair of lower feed rollers arranged therebelow on a shaft 301L, Fig. 15, that is parallel with the upper shaft 301U. The lower shaft 301L carries a gear 305 that is adapted to be driven in a manner similar to that described above in connection with the in-feeding rollers for the receiving stations 30 and 170.

Extending forwardly from the feed rollers 300U is a guide plate 306 supported on spaced apart cross bars 307 between the side panels 191A and 192A, and at the end of this guide plate 306 opposite the feed rollers 300U are a pair of feed rollers 309U carried on a shaft 310U. Arranged below the feed rollers 309U on a shaft 310L, Fig. 19, are a corresponding pair of feed rollers 309L which normally engage the feed rollers 309U. The feed rollers thus described which are at either end of the guide plate 306 have the respective bites thereof aligned with the plane of the guide plate 306, and the shafts 301U and 310U are preferably spaced so that the leading end of the card as C which is to be mailed is passed by the in-feeding rollers to the rollers 309U and 309L just as the trailing end of this card passes beyond the in-feeding rollers. As will be described below, the mailing card as C thus passed along the guide plate 306 is to be printed in the receiving station 170A.

The shafts 301U and 310U are each supported for vertical play so that the upper rollers carried thereby may be relieved of the lower feed rollers paired therewith when a card as C is passed to the bite thereof. In this instance, such play is afforded by rotatably supporting one end of these two shafts in arms as 315 pivoted at one end on pins as 316 extended inwardly of the side panel 191A of the receiving station 170A. Tensioned about the shanks of the pins 316 are torsion springs as 316S having the free ends disposed on the corresponding ends of the shafts 301U and 310U so as to yieldably hold the upper ends of the feed rollers in firm engagement with the lower ones that are paired therewith, and the ends of the shafts 301U and 310U opposite the arms 315 are arranged for vertical play as described above.

Below the guide plate 306 is a card stacker 320, Fig. 15, adapted to receive the ledger cards which of course are not to pass along the guide plate 306. Deflector fingers 321 of the kind described above are associated with the in-feeding rollers, and these deflectors are fastened in spaced relation on a rock shaft 322 which extends transversely between the side panels 191A and 192A below the end portion of the guide plate 306 that is adjacent the in-feeding rollers. As will be seen in Fig. 15, these deflector fingers are normally in a released position with the narrow top edges thereof aligned with the plane of the guide plate 306 inwardly of the in-feeding rollers so as to normally direct a card that is in the bite of these rollers forwardly along the guide plate 306.

An upstanding pin 323 is fixed to the rock shaft 322 adjacent one end thereof, and the upper end of this pin is engaged by one end of a control link 325 disposed at right angles to the axis of the rock shaft 322. The control link 325 when pulled to the left as viewed in Fig. 15 elevates the deflector fingers 321 out of normal position so as to block off the guide plate 306. This action is attained by connecting the control link at the end opposite the pin 323 to the armature 328A of a solenoid 328 which is adapted to be energized to elevate the deflector fingers 321 just prior to a ledger card being passed to the in-feeding rollers from the machine M. It will be appreciated from the description set forth in connection with the receiving stations 30 and 170 that the deflector fingers 321 in elevated position direct the ledger cards to the card stacker 320, and that the solenoid 328 is timed by a cam controlled switch on the main cam shaft of the machine M to enable this to occur alternately between the cards as C which are to be mailed.

A lock similar to that shown in Figs. 6 to 9 is afforded to hold the deflectors 321 in elevated position. Therefore, the details of this lock need not be described, but it may be pointed out that the trigger of the lock 329, Fig. 15, includes a toe 329T which engages the end of the arm 315 opposite the pivot therefor so as to be triggered to release the lock when a ledger card as C is passed by the elevated deflectors and the in-feeding rollers as 300U on to the ledger stackers 320.

Forwardly of the feed rollers 309U is a station RS, Fig. 15, where there may be located a second guide plate like the guide plate 306 having a card stacker therebelow for the receipt of a second ledger card which would be a duplicate of the ledger card passed to the stacker 320, this particular arrangement having been described above in Figs. 13 and 14. However, inasmuch as the receiving station 170A is disclosed in this instance as adapted for ledger cards of a single order only, the station RS is by-passed, but if ledger cards of a second order are in fact to be handled by the receiving station 170A then there will be deflector fingers associated with the bites between the feed rollers 309U and 309L, and these deflector fingers will be controlled by the control link 325 in the same way that was previously described in connection with the ledger cards of multiple order handled by the receiving station 170.

Mention was made above of the fact that the station RS is by-passed in the receiving station 170A. Thus, a relatively narrow guide plate 330 is extended forwardly from the feed rollers 309U, and this guide plate has a flat upper face for supporting a card as C passed off the guide plate 306 by the feed means including the rollers 300 and 309U. The guide bar 330 is but loosely supported in position, and thus is adapted to be removed from the station RS in order that the receiving station 170A may handle ledger cards of a second order as was mentioned above or, as will be described below, to enable a card turn-over or reversing means to be removably positioned at the station RS.

Forwardly of the guide bar 330 is a guide plate 221C which corresponds to the guide plate 221, Fig. 13, and the guide plate 330 when in place spans the station RS between the adjacent ends of the guide plates 306 and 221C. At the end of the guide plate 221C which faces in the direction of the guide plate 306 are spaced apart pairs of upper and lower feed rollers 333U and 333L, Figs. 15 and 16, which normally are engaged one with the other so as to receive the leading end of a card as C fed along the guide bar 330 prior to the trailing end of this card passing beyond the forwardly feeding rollers 309U and 309L. The rollers 333U and 333L are carried on respective shafts 334U and 334L, Fig. 16, which as in the instance of the shafts supporting the other feed rollers thus far described, are in parallel vertical alignment. The upper of these shafts, 334U, is arranged for vertical play as will be described, and the lower shaft is journalled for rotation in bearing members mounted inboard on the side panels 191A and 192A. On the upper shaft 334U is a gear 335 driven by a gear 336 carried on the lower shaft 334L, and the lower shaft in addition carries a sprocket 337 by which the shaft 334L and the gear 336 are driven as will be described.

Preferably, there is afforded a relatively long leaf spring 340 attached at one end to the shaft 301U as shown in Fig. 15, this spring extending the length of and resting on the guide way afforded by the guide plate 306 and the guide bar 330 so as to hold the cards as C advancing forwardly through the receiving station 170A down on the guide plate 306 and the guide bar 330. In addition, a pair of leaf springs 341 and 342 are arranged at either side of the leaf spring 340 on the guide plate 306, and these two springs are attached at one end in spaced relation on a shaft 345 extended between the side panels at the in-put end of the receiving station 17-A, spacer collars as 346 on the shaft 345 serving to maintain springs 341 and 342 in the desired spaced relation to assure that an address card on the guide plate 306 is accurately positioned for in-feeding to the rollers 309U and 309L.

As will be described, a business instrument which is to be mailed is fed along the guide plate 221C, Fig. 15, first to a positioning means that temporarily halts this card in its forward travel along the guide plate 221C to accurately position this card for the printing operation, and after print has been performed this card is then fed to a receiving hopper such as the mailing hopper that was described above in connection with Figs. 13 and 14. Thus, at the end of the guide plate 221C opposite the feed rollers 333U and 333L are a set of upper feed rollers 350U, Fig. 15, carried in spaced relation on a shaft 351U, and mated with these rollers are a corresponding set of lower feed rollers 350L, Fig. 17, that are carried on a shaft 351L to normally engage the rollers 350U. The feed rollers 350L at the end of the guide plate 221C opposite the feed rollers 333U and 333L correspond to the feed rollers 238 shown in Fig. 13 and hence are adapted to advance the leading end of each business instrument on the guide plate 221C against a deflector as 265, Fig. 14, opening into a mailing hopper as 180, this occurring, of course, just as the trailing end of the card on the guide plate 221C passes beyond the bites between the feed rollers 333U and 333L.

The shaft 351U, Fig. 15, carrying the out-feeding rollers 350U is supported between the side panels 191A and 192A for vertical play in the same way that was described in connection with the shafts 301U and 310U, and hence the details of this arrangement will not be repeated. The shaft 351L carries a sprocket 353, Fig. 17, which is driven in a way to be described.

Intermediate the ends of the guide plate 221C is an opening as 221A, Figs. 13 and 17, that was mentioned above enabling the downwardly disposed face of each business instrument on the guide plate 221C to be printed. The printing means in this instance includes a mutilated printing cylinder 360, Figs. 16 and 17, adapted to carry on the periphery thereof either a narrow arcuate printing plate bearing a signature or a like printing plate bearing a date, such plates being interchangeable on the printing cylinder 360 and adapted to be carried thereon in a conventional way.

The printing cylinder 360 is carried on a shaft 361 having at one end a male dog 364 adapted to drivingly engage a female dog 365 carried on a drive shaft 366 which represents the driven element of a one revolution clutch 370 as will be described.

The shaft 366 which carries the female dog 365 is supported for rotation in a bearing mounted in the side panel 191A and is positioned thereby to receive the dog 364 carried by the printing cylinder shaft. At one end of the printing cylinder shaft 361 there is a handle 375 having a boss 375B which carries a bearing 376 in which the end of the printing cylinder shaft opposite the dog 364 may be supported for rotation. Thus, the dog 364, the printing cylinder, the printing cylinder shaft and the handle elements represent a unitary structure that may be re-movably set and locked in the mounting plate 295, Figs. 14 and 15, that depends from the outer face of the side panel 192A. The mounting panel 295 and the side panel 192A include registered openings as 295A, Fig. 14, in which the boss 375B carried by the handle 375 is adapted to seat with the dogs 364 and 365 in driving engagement as shown in Fig. 17.

The printing cylinder 360, when in the operative position shown in Fig. 17, engages a rubber ink roller 378, Fig. 16, supported for rotation therebelow. Supported for rotation below the rubber ink roller and engaged therewith is a brass distributing roller 379, and supported below the brass roller and in engagement therewith is a felt distributing roller 380. Below the felt cylinder 380 is an ink pan 383, and ink is relayed from the ink pan to the felt cylinder by an oscillatable ductor roller 385. The ductor 385 is journalled in openings provided in the lower ends of a pair of arms 386, and these arms at the upper ends are fast on a rock shaft 388. The arms 386 which carry the ductor roller are spring urged to normally hold the ductor 385 against the felt roller 380. At one end of the rock shaft 388 is an upstanding arm 390 which carries at the upper end thereof a follower 391 adapted to be engaged by a keystone cam 395 mounted on the driven shaft 366 of the one revolution clutch 370, so that for each cycle of engagement of this clutch the rise 395R on the cam 395 is effective on the follower 391 to oscillate the ductor 385 from the felt roller 380 to the supply of ink in the pan 383, the ink-laden ductor returning to spring-biased normal position engaged with the felt roller when the swell 395D of the cam is presented to the follower 391. In this manner, the ductor is operative each time the clutch 370 engages to relay a quantity of ink from the ink pan to the felt roller included in the ink train.

Supported over the opening 221A in the guide plate 221C where the printing cylinder 360 is positioned is a platen roller 398. The platen roller is carried by a shaft 399, and the opposite ends of the shaft 399 are supported for rotation in the side panels 191A and 192A as shown in Fig. 15.

The ink train including the three rollers 378, 379 and 380 is driven by the brass roller 379. Thus, as shown in Figs. 17 and 18, the brass roller 379 is carried on a shaft 400 supported for rotation in bearings as 401 mounted in the side panels 191A and 192A. One end of the shaft 400 is disposed outwardly of the side panel 191A, and mounted on this end of the shaft 400 is a sprocket 403, Fig. 18, adapted to be driven by a constantly running chain 405. The drive chain 405 is played around a sprocket 406 that is carried on the end of the shaft 334L extended outwardly of the side panel 191A, as shown in Fig. 17. It will be recalled that the shaft 334L is adapted to be driven by a sprocket 337 in a way to be described and hence the sprockets 337 and 406 derive constant motion from a common means.

Spaced forwardly of the sprocket 406 is a sprocket 409 about which the chain 405 is also passed, and this sprocket is carried on a sleeve 410, Fig. 17, mounted concentrically on the driven shaft 366 of the clutch 370. However, the sleeve 410 is rotatably supported independently of the driven shaft 366 so as to be free running with respect thereto, and moreover represents the driving element of the clutch 370. The chain 405 is tensioned by an idler sprocket 412 carried on a stub shaft 413 positioned for rotation between the sprockets 406 and 409.

It is desirable that the feed rollers as 300U and 309U being driven in a one-to-one ratio at a relatively high speed and that the card to be printed with a signature be advanced through the printing station at a reduced speed, preferably at about one-third speed. Such is attained by reducing gears to be described. Thus, as is apparent in Figs. 15 and 15A, one end of the shaft 301L which carries the driven gear 305 extends outboard of the side panel 191A, and on this end of the shaft 301L that is disposed outwardly of the side panel 191A is a main drive sprocket 425. Forwardly of the sprocket 425 is a sprocket 426 which is also outboard of the side panel 191A, and played about the sprockets 425 and 426 is a chain 427, these drive means being shrouded by a cover plate 430, Fig. 15. The sprocket 426 is carried at one end of the shaft 310L, Figs. 15A and 19, and it is the shaft 310L which carries a set of feed rollers 309L. The feed rollers 309L rotate counterclockwise as viewed in Fig. 19, and drivingly engage the upper feed rollers 309U, so that the feed rollers which are at either end of the guide plate 306 are driven in a one-to-one ratio at a relatively high speed. Inboard of the side panel 191A, the shaft 310L carries a small pinion gear 435 which rotates therewith, and the gear 435 is meshed with a large spur gear 436 carried on a stub shaft 437 supported at the lower end of a gear cluster arm 440. The arm 440 at the upper end is mounted on a pin extending inwardly of the side panel 191A as shown in Fig. 15.

Keyer to the spur gear 436 is a small pinion gear 442, and this gear is meshed with a large spur gear 443 carried on a sleeve 443A mounted concentric to the shaft 310L inwardly of the gear 435. At the end of the sleeve 443A opposite the gear 443 is a sprocket 445 and the arrangement is such that the sprocket 445 is driven at reduced speed as aforesaid so as to slow down the speed of a card to be printed.

The sprocket 445 is in alignment with the sprocket 337 described above as carried on the shaft 334L. A chain 446 is played about the sprocket 445 at one end and at the other end is played about the sprocket 445 at one end and at the other end is played about the sprocket 353, Fig. 17, which is carried on the shaft 351L, the two passes of the chain 446 engaging the sprocket 337 on shaft 334L intermediate the sprockets 445 and 353. As was described above, there is a sprocket 406 on the shaft 334L outwardly of the side panel 191A, this sprocket driving the chain 405 which in turn rotates constantly the sprocket 409 representing in part the driving element of the clutch 370.

The one-revolution clutch 370 is of a known kind, being described in previous of my patents particularly United States Patent No. 2,296,277, patented September 22, 1942, and hence the operating details of the clutch 370 need not be set forth herein. It may be pointed out, however, that normally the driving element of the clutch 370 including the sprocket 409 is disengaged from the driven element of the clutch which includes the shaft 366. This disengaged relation is maintained by an inclined control arm 450, Figs. 17 and 18, which at the lower end includes a cammed edge 450C bearing on a pin 370P carried by a sleeve 370S which represents one of the driven elements of the clutch normally held disengaged from the driving elements manifest in the cammed edge 450C bearing against the pin 370P.

The control arm 450 is carried in a bracket or cradle 452 having a pair of upwardly extended arms 453 that are journalled on a pivot pin 455, this pivot pin being supported at one end in the side panel 191A and at the opposite end in a vertically disposed mounting plate 456 supported outboard of the side panel 191A as shown in Fig. 17.

The arm 450 holding the clutch 370 disengaged is controlled by an armature 460A of a solenoid 460 which is mounted between the panels 191A and the mounting plate 456. As shown in Fig. 18, the control arm 450 is inclined substantially in a 45° plane, and the solenoid 460 is positioned so that the armature 460A is at right angles to the control arm 450. The lower edge of the armature 460A is provided with a notch 460N in which the upper end of the control arm 450 is seated. A spring 460S is attached at one end to a pin 462 mounted in and extending outwardly of the side panel 191A. The opposite end of the spring 460S is anchored to a pin 465 carried by the armature 460A, and this pin projects downwardly through the armature 460A into an elongated opening 467 afforded in a plate 468 that is rigid with the solenoid housing, this opening 467 serving to define the extent of downward movement of the armature 460A when the solenoid is energized.

When the solenoid 460 is energized, the armature 460A is pulled downwardly as viewed in Fig. 18 and is effective to pivot the control arm 450 clockwise to lift the cam edge 450C off the pin 450P whereupon the driven element of the clutch 370 including the shaft 366 is coupled to the constantly rotating driving element of the clutch 370 including the sprocket 409. As a consequence, shaft 366 is driven in a counterclockwise direction as viewed in Fig. 16.

The solenoid 460 is energized in a way to be described for one cycle of revolution then is deenergized in the same cycle to release the control arm 450 so that the control arm 450 which includes the cam edge 450C is released to again rest on the rotating sleeve 450S, and at the end of the single 360° rotation of the shaft 366 the pin 370P reengages the cam edge 450C to uncouple the clutch 370. Hence, for each engagement of the clutch 370, the keystone cam 395, Fig. 16 is turned through 360° together with the printing cylinder 360 on the shaft 366, and as will be recognized from the description to follow the printing cylinder in the upper pass thereof is parallel with the forward advancing movement of the mailing card at printing position that is to be printed with a signature thereby, the card thus printed being squeezed between the printing cylinder 360 and the free running platen 398.

The solenoid 460 is energized through a normally open switch SW, Figs. 15 and 16, which is positioned above the guideplate 221C forwardly of the platen roller 398, the switch SW being carried by a mounting plate 470, Fig. 15, attached at one end to the side panel 192A. The passage of the card to be printed on to the guide plate 221C is sensed prior to this card arriving at printing position beneath the platen 398, and this sensing operation is effective to close the switch SW and energize the solenoid 460. Thus, normally reposed in the opening 221B in the guide plate 221C is a sensing finger 472, Figs. 15 and 16, which is adapted in the present instance to be lifted or actuated by the leading edge of the card that is to be printed passing along the guide plate 221C beyond the feed rollers as 333U. The sensing finger 472 is carried at one end of an arm 473 which at the opposite end is fast on a collar 473C which in turn is loosely mounted for pivotal movement on a switch control rock shaft 474 adapted to control opening and closing of the switch SW. The control shaft 474 for the switch SW is arranged at right angles to the arm 473 carrying the sensing finger 472 and in this instance is supported at either end in bearing lugs as 475 supported in spaced relation on the inner wall of the side panel 192A.

Spaced from the collar 473C is another collar 486 on the shaft 474, and this collar is fixed to the shaft 474 as by a set screw 486S. The collars 473C and 486 are flexibly coupled as by a torsion spring 485S concentric on the shaft 474 between the two collars, so that when the sensing finger 472 is lifted and the collar 473C is turned, the spring 485S turns also and is effective on the collar 486 to turn the switch control shaft 474 clockwise as viewed in Fig. 16.

Fast to the end of the control shaft 474 adjacent the switch SW as by a set screw 480S is a collar 480, and this collar 480 carries a control finger 481 positioned below and normally disengaged from a switch arm 482 which when lifted by the finger 481 closes the switch SW. Thus, when the control shaft 474 is rotated clockwise by a card as C passing the sensing finger 472, the control finger 481 is effective on the switch arm 482 to close the switch SW which thereupon energizes the solenoid 460 to engage the clutch 370.

The collar 473C carrying the sensing finger includes a dog 473D mated in an enlarged notch 477N provided in a collar 477 that is fast on the shaft 474 as by a set screw 477S. This affords lost motion for the collar 473C manifest in the dog 473D turning within the notch 477N, and enables the arm 473 to be lifted in the event a card were to be jammed under the sensing finger 472.

When the card that tripped the sensing finger 472 passes beyond the opening 221B in a way to be described the sensing finger is released to normal position, switch SW is opened to deenergize the solenoid 460 and the control arm 450 for the clutch 370 engages the clutch stop pin 370P to disable the clutch at the end of the same cycle wherein the clutch was engaged.

As was mentioned above, the card on the guide plate 221C that is to be mailed is to be momentarily halted in its forward advancing movement, this occurring just after the leading end of the card trips the sensing finger 472 and just prior to the arrival of this card at the printing station afforded by the printing cylinder 360 and its cooperating platen 398. This is attained by positioning a stop finger 490 in the portion of the guide way afforded by the guide plate 221C between the sensing finger 472 and the platen roller 398. The stop finger 490 includes a blade 490B normally elevated sufficiently above the guide plate 221C to enable a card to be fed along the guide plate 221C therebelow. At one end, the stop finger 490 is formed with a depending arm 492, Fig. 15, having a sleeve 493 thereon fixed to a rock shaft 495 which extends longitudinally of the side panel 191A, this rock shaft being supported in bearing lugs as 495A extending inwardly from the side panel 191A similar to the way in which the bearing lugs as 475 support the shaft 474. Held to the rock shaft 495 is by a set screw 497S is a block 497. A tension spring 496 is anchored at one end to a pin on the side panel 191A and at the other end of this spring is attached to the end of the block 497 adjacent the side panel 191A as shown in Fig. 16 so as to normally position the rock shaft 495 with the stop finger 490 elevated above the guide plate 221C.

At the end of the rock shaft 495 away from the arm 497 is a depending arm 505 formed with a collar 508 that is fastened to the rock shaft 495. At its lower end, the arm 505 carries a cam follower in the form of a roller 510 which is positioned by the spring 496 to be within the path of the rise 395R on the cam 395. The leading end of the rise 395R on the cam 395 is normally removed but a slight distance from the follower 510 as can be seen in Fig. 16 which is the condition where the stop finger 490 is biased in elevated position. The left end of the shaft 334U, Fig. 16, is carried by a lever 500 pivoted on a pin 501 mounted in the side plate 191A. The lever 500 has a toe 503 engaged with the underside of the block 497 whereby the block 497 and its spring 496 are effective normally to apply downward tension to the shaft 334U.

When the sensing finger 472 is elevated by the leading end of a card passing over the opening 221B in the guide plate 221C, the one revolution clutch 370 engages, and practically simultaneously with this, the rise 395R on the cam 395 wipes the cam follower 510. Such engagement of the cam with its follower 510 pivots the arm 505 slightly in the direction of the side plate 191A, and the rock shaft 495 as viewed in Fig. 16 is turned in a clockwise direction against the return action of the spring 496. The stop finger 490 accordingly is lowered in to engagement with the guide plate 221C behind the printing station to engage and halt the leading end of the card that is to be printed with a signature so that forward movement thereof momentarily ceases until after the trailing end of the rise 395R on the cam 395 passes off the cam follower 510, whereupon the stop finger 490 is once again elevated by the spring 496. It will be appreciated that the alternate lowering and then raising of the stop finger 490 under control of the cam 395 is a relatively rapid action, and during the time that the stop finger 490 is down, tension on the shaft 334U is relieved so that in effect the rollers 333U skid on the card engaged by the stop finger 490 to bring this card into accurate alignment therewith.

Once the stop finger 490 has been elevated, the spring 496 is again effective on the shaft 334U, and the card that underwent alignment continues to be in-fed in a positive manner by the feed rollers 333U and 333L in the direction of the printing station afforded by the printing cylinder 360, bearing in mind that when the clutch 370 was engaged for one cycle to depress and then raise the stop finger 490 the driven shaft 366 of the clutch continued to rotate for a full 360° cycle. Accordingly, after the card to be printed is released by the stop finger 490 the printing cylinder 360 is effective on the downwardly disposed face of the card when passing over the opening 221A to print a signature in proper position adjacent the name and address thereon which, in this instance, will be the name and address of a payee. After the card as C has thus been printed with a signature, the feed rollers 333U and 333L are effective on the trailing end thereof to feed this card bearing a signature on to the feed rollers as 350U which then pass the card bearing the signature into the mailing hopper, and after the trailing end of the card passes beyond the sensing finger 472 the latter is released to normal position within the opening 221B and the switch SW is thereupon opened.

To enable the leading end of the card as momentarily halted by the depressed stop finger 490 to be quickly released when the stop finger is elevated, a stripper 509, Fig. 15, is afforded over the guide plate 221C in advance of the stop finger 490. The stripper 509 is in the form of a block of substantial width and length, and may be conveniently anchored to the side edge of the guide plate 221C which is adjacent the rock shaft 495. There is clearance between the lower face of the stripper 590 and the guide plate 221C enabling a card to pass therebeneath, and when the stop finger 490 is depressed the stripper 509 also prevents the card undergoing alignment from buckling between the leading end thereof halted by the depressed stop finger 490 and the portion adjacent the trailing end engaged by the feed rollers 334U and 334L.

There are instances where it is desirable to print the business instruments to be mailed with a date in the receiving station of the present invention rather than a signature, this occurring particularly in the production of utility bills and like notices with the machine M as distinguished from the production of instruments which are of a negotiable nature requiring a validating signature. When such dates are to be printed on bills or the like produced in the machine M, this is usually to be done on the face of the bill opposite the face that was printed with a name and address in the machine M, Fig. 1, since this opposed face is the one ordinarily bearing the data pertaining to charges and the like. It will therefore be borne in mind that as much bills emit from the machine M, the face to be dated is the one that is disposed upwardly, and this requires that each card as C in the form of a bill or the like which is to be mailed be turned over before attaining date printing position in the receiving station as 170A. In this connection, it will be recalled that mention was made that the printing cylinder 360 is adapted to interchangeably carry either a printing plate bearing a signature or one bearing a date; hence, so far as printing of the date in the receiving station 170A is concerned, it is unnecessary to redescribe the printing means illustrated in Figs. 15 and 16, since except for the printing plate these means in addition to the control and the stop finger 490 in advance of the printing station will be identical as well as the way in which the cards bearing a date are passed to the mailing hopper.

As was mentioned above, the receiving station 170A, Fig. 15, includes a removable guide plate 330 spanning the guide plates 306 and 221C. The station RS, where the guide plate 330 is located, is the station where cards as C which are of a kind to be printed with a date are to be turned face for face as will now be described.

It will be recalled that in connection with the receiving station 170A reference was made at times to Fig. 19, and thus the feed rollers identified in Fig. 19 serve to orient the card turn over means as located at the card turn over station RS just forwardly of the guide plate 306.

As shown in Fig. 20, the side plates 191A and 192A having inwardly turned flanges at the lower edges thereof serve by these to support in spaced relation a pair of vertically disposed mounting plates 511 and 512 having the lower end portions thereof extending substantially below the lower edges of the side panels 191A and 192A. These mounting plates support the parts associated with the card turn over means, and from this it will be seen that such card turning means may be readily located at or removed from the station RS.

In the upper edges of the mounting plates 511 and 512 there are bifurcations 515 disposed opposite one another. A relatively heavy pressure roller 516 is arranged between the mounting plates 511 and 512 with the axis thereof parallel to that of the feed rollers 309U and 309L shown in Fig. 19. At either end of the pressure roller 516 are trunnions as 517, and the ends of these trunnions are carried rotatably in the respective bifurcations 515, the arrangement being such that the pressure roller 516 is located at the turning station RS just forwardly of the feed rollers 309U and 309L. Associated with the pressure roller 516 is a pair of relatively small feed rollers 520. These feed rollers each have an axle as 525, Fig. 19, mounted at either side of the pressure roller 516 so as to be eccentric to the axis of the pressure roller, the arrangement being such that peripheral portions of the feed rollers 520 extend outboard of the periphery of the pressure roller 516 as shown in Fig. 19.

The spacing between the pair of feed rollers 520 is less than that between the feed rollers 309U and 309L that are spaced apart on the respective shafts 310U and 310L as can be seen in Fig. 20. Arranged on the shaft 310L inwardly of the feed rollers 309L carried thereby are a pair of feed rollers as 520A having diameters equal to that of the feed rollers 309L, and the rollers 520A engage the feed rollers 520 carried by the pressure roller 516. From this it will be seen that the leading end of a card passing off the guide plate 306 and into the bite of the feed rollers 309U and 309L is next fed by these feed rollers to the bite of the feed rollers 520.

As shown in Fig. 19, the feed rollers 520 engage the rollers 520A paired therewith at points below the bites of the feed rollers 309U and 309L, and hence the leading end of the card passing beyond the feed rollers 309U and 309L is directed downwardly by the feed rollers 520 and 520A, the relatively heavy pressure roller 516 insuring this to be a positive action.

The card thus deflected downwardly from the guideway afforded by the guide plate 306 does so along a downwardly inclined guide plate 525 supported between the mounting plates 511 and 512 by spacer bars 526. The lower end of the guide plate 525 terminates short of the lower edges of the mounting plates 511 and 512 as can be seen in Fig. 19, and spaced forwardly of the lower edge of the guide plate 525 is a plate 528 disposed in a vertical plane serving as a back stop for the leading end of the card on the guide plate 525. The plate 528 includes at the lower end a right angled extension 529 projecting in the direction of the guide plate 525.

The back stop 528 is so positioned that after the trailing end of the card as C on the downwardly inclined guide plate 525 has passed beyond the pressure roller 516, the leading end of this card on the guide plate 525 is opposite the back stop 528 as shown in Figs. 21 and 24, and the trailing end is freed of the rollers 520 and 520A to enable the card to drop toward the plate extension 529 as shown in Fig. 25. When this position for the card as C on the guide plate 525 is attained, means are actuated to turn this card over so that the card is reversed face for face and at the same time means to be described are operative to re-deliver this card back to the guideway in the receiving station as 170A for subsequent travel in the direction of the printing station included therein.

In the present instance, the side edge portions of the card as C on the guide plate 525 overhang the side edges of the guide plate 525 such that these overhanging portions at the side edges of the card C are above respective card flippers in the form of rollers 530 arranged at the lower end of the guide plate 525 beneath the lower face LF of the card as C disposed thereon, this lower face LF of the card being the one that was printed with data including a name and address in the machine M. Disposed over the upper face of the card as C on the guide plate 525 are a pair of supporting fingers as 531, these fingers being disposed inwardly of the flippers 530.

The flippers 530 are carried on respective axles 535 extended inwardly from the lower ends of a corresponding pair of oscillatable flipper arms as 536 and 537, and these arms 536 and 537 are fast on a shaft 538 which extends transversely between the mounting plates 511 and 512 as shown in Fig. 20 so as to oscillate with the shaft 538 in a manner to be explained. As shown in Fig. 19, the arm 536 on the shaft 538 is disposed outboard of the mounting plate 512, and the axle 535 corresponding thereto projects through an arcuate guide slot 540, there being a similar guide slot in the mounting plate 511 for the axle 535 corresponding to the arm 537. The arm 536 being outboard of the mounting plate 512 enables the flippers 530 to be operated manually when it is desired to manually clear a card as C from the station RS.

The supporting fingers 531 are fast on the shaft 538 inwardly of the flippers 530 so as to oscillate therewith, and one end of the shaft 538, as shown in Fig. 20, extends outboard of the mounting plate 511 where a pinion 542 is made fast thereto. The pinion 542 is meshed with a rack 543 which normally is in elevated position, so that when the rack 543 is retracted downwardly, in a way to be described, the arms 536 and 537 are rapidly rotated counterclockwise as viewed in Figs. 19 and 24 to engage the flippers 530 with the overhanging marginal side edge portions of the card as C on the guide plate 525. The supporting fingers 531 being fast on the shaft 538 are likewise turned counterclockwise.

A pair of spaced apart feed bands are arranged in a plane that is substantially normal to the plane of the guide plate 525, and these feed bands 545 are driven continuously by a pair of pulleys 546, Fig. 22, mounted on the shaft 334L inwardly of the feed rollers 333L carried thereby. The feed bands 545 are likewise played about a pair of idler pulleys 548 which are freely rotatable on the shaft 538 outwardly of the fingers 531, and the arrangement is such that in the upper pass thereof the bands 545 are effective to relay a turned over or inverted card C to the feed rollers 333U and 333L as will be described. It will be appreciated that the thickness of the card as C in Fig. 24 is exaggerated, inasmuch as the card on the guide plate 525 is normally free of the pass of the bands 545 about the idler pulleys 548.

The rack 543, which when retracted operates the card turn over means, is fixed to the armature 550A of a solenoid 550, Figs. 19 and 20. The solenoid 550 is mounted on the plate 511 in an outboard relation as can be seen in Fig. 19, and when energized the armature 550A thereof is effective to retract the rack 543 downwardly to rotate the pinion 542 counterclockwise as viewed in Fig. 22. Operation of the solenoid 550 is under the control of a switch controlled by a cam on the main cam shaft of the machine M, the timing of this control being such that when a card as C is operatively positioned with respect to the flipper rollers 530 the solenoid 550 is energized to drive the rack 543. This, of course, is a relatively rapid action, but it is not until a turned over card has been delivered to the feed rollers 333U and 333L by the bands 545 that the solenoid 550 is deenergized to retract the flippers 530 and the fingers 531 to normal position.

In Figs. 24 to 26, progressive inversion of a card in a counterclockwise direction is illustrated in typical stages. As the rack 543 is retracted, the card C is first lifted off the guide plate 525 by the flipper rollers 530, such being manifest in the lower edge of the card C dropping on to and being dragged along the extension 529 of the back stop 528 as shown in Fig. 25. The flipper rollers next press the marginal side edges of the face UF of the card C against the bands 545 which thereupon pick up the card and deliver the inverted card upwardly to the engaged feed rollers 333U and 333L as shown in Fig. 26. As will be observed by comparing Figs. 24 and 26, oscillation of the flipper means occurs through an angle of approximately 90°, and in any event substantially less than 180° inasmuch as the card to be turned enters the turnover station in an inclined plane and leaves the turnover station in an inclined plane.

Once the turned over card has been redelivered back to the guideway of the receiving station with the face thereof opposite the face printed in the machine M disposed downwardly, the feed rollers 333U and 333L are operative to advance this card to be printed with a signature along the guide plate 221C in the direction of the printing station. In this instance, of course, the printing cylinder 360 has been interchanged to carry a printing plate bearing the date to be printed on the turned over cards which are to be mailed. Accordingly, the card to be printed with a date on the face that is disposed downwardly on the guide plate 221C first trips the sensing finger 472 whereupon means are actuated as above described to set in operation the printing cylinder 360. The stop finger which momentarily halts the card in advance of the printing means may be of a modified construction shown in Figs. 27 and 28 as will now be described.

Mention was made above of the stripper 509, Fig. 15. In Figs. 27 and 28 there is illustrated a modified form of stripper, in this instance 509A, grooved at 509G along one side edge thereof. The groove 509G is relatively narrow and is adapted to receive the flange or lip at the side of the guide plate 221C, which lip is adapted to confine the business instruments passing along the guide plate 221C as above described. A pair of pins 575 are frictionally retained in openings 576 provided in the block 509A inwardly of the groove 509G, and the lower ends of these pins are provided with eccentric shanks 575E as shown in Fig. 28. A pair of clamping pins 588 are mounted in guide openings provided therefor in the block 509G, and these openings are at right angles to the openings 576 in which the eccentric pins 575 are mounted. The clamping pins 588 each have one end disposed adjacent the eccentric portion of the eccentric pins 575 such that when the pins 575 are rotated to present the rises of the eccentric portions thereof to the pins 588 the latter are forced outwardly into the groove 509G to engage the lip on the guide plate 221C disposed in the groove 509G as aforesaid, and in this manner the stripper 509A may be readily anchored in operative position in spaced relation above the guide plate 221C to admit of a card C passing therebeneath.

The forward edge of the stripper 509A includes a downwardly opening slot 590 in which is mounted for vertical movement a stop finger in the form of an elongated blade 591, and this blade includes at the medial portion thereof an enlarged head 593 projecting above the top surface of the stripper 509A. The head of the stop finger 591 is notched at either side in the portion thereof disposed above the stripper 509A, and these notches receive corresponding fingers at the forward end of a leaf spring 595 anchored at the opposite end to the stripper 509A. The leaf spring 590 normally is effective to retract the stop finger 591 upwardly within the slot 590 in the stripper 509A so that until the blade thereof is lowered a card as C is free to pass therebelow along the guide plate 221C.

Disposed over the head of the stop finger is a hammer in the form of a screw 596 carried at the end of an arm 597, and this arm includes at the end opposite the screw 496 depending portion 598 fast on the rock shaft 495 that was described above. From this it will be seen that when the cam 395 is effective on the follower 510 to pivot the rock shaft 495 clockwise as viewed in Fig. 24, the hammer strikes the head 593 and the stop finger is thereupon driven downwardly to engage the guide plate 221C, this occurring of course to enable the card to be printed to undergo alignment in advance of the printing cylinder 360 being effective thereon.

Thus, while I have illustrated and described the preferred embodiment of my invention, it is to be understood that this is capable of variation and modification, and I therefore do not wish to be limited to the precise details set forth, but desire to avail myself of such changes and alterations as fall within the purview of the following claims.

I claim:

1. In a machine of the kind described adapted to produce business instruments of different orders, a receiving station including different stackers correspondingly as there are different orders of the instruments, a guideway through the receiving station, feed means for advancing instruments toward the different stackers, a deflector associated with one of the stackers and having a normal released position enabling an instrument of one order to be fed along said guideway past said one stacker to a second one of the stackers, means to actuate and lock in actuated position said deflector in advance of an instrument of another order that is to be received in said one stacker so that the deflector in actuated position is operative to direct said other ordered instrument to the said one stacker, and means operated by the other ordered instrument when passing to said one stacker to release the deflector from actuated position.

2. In a printing machine of the kind described having a printing station for printing data on one face of business instruments of different orders produced in the machine, a receiving station including different stackers correspondingly as there are different orders of the instruments, a guideway through the receiving station, feed means for advancing instruments emitted from the printing station in said machine toward the different stackers, a deflector associated with one of the stackers and having a normal released position enabling an instrument of one order to be fed along said guideway past said one stacker to a second one of the stackers, means to actuate and lock in actuated position said deflector in advance of an instrument of another order that is to be received in said one stacker so that the deflector in actuated position is operative to direct said other ordered instrument to said one stacker, means operated by the other instrument when passing into said one stacker to release the lock, and printing means along said guideway between said stackers to print data on a face of the instruments of the said one order prior to these being passed to the second of said stackers.

3. In a printing machine of the kind described having a printing station for printing data on a face of instruments of different orders produced in the machine, a receiving station including different stackers correspondingly as there are different orders of the instrument, a guideway through the receiving station, feed means for advancing instruments emitted from the printing station to the different stackers, a deflector associated with one of the stackers and having a normal released position enabling an instrument of one order to be fed along said guideway past said one stacker to a second one of the stackers, means to actuate and lock in actuated position said deflector in advance of an instrument of another order that is to be received in said one stacker so that the deflector in actuated position is operative to direct said other ordered instrument to said one stacker, means operated by the other ordered instrument when passing to said one stacker to release the lock, means between said stackers for turning over instruments passing beyond said one stacker so that the faces of each such instrument are reversed with respect to said guideway, and printing means along said guideway between said second stacker and the turning means to print data on a face of the instrument that was turned over prior to this instrument being directed to the second of said stackers.

4. In a machine of the kind described adapted to produce business instruments of different orders, a receiving station including at least a pair of stackers correspondingly as there are different orders of the instruments, a guideway through the receiving station, feed means for advancing the instruments toward the different stackers, a deflector associated with each of said stackers and having a normal released position enabling an instrument of one order to be fed along said guideway past said stackers, means to simultaneously actuate and lock in actuated position said deflectors in advance of an instrument of another order that is to be received in the first of said stackers so that the actuated deflector associated with the first of the stackers is operative to direct said other ordered instrument to the first of said stackers, means operated by the other ordered instrument when passing to the first of said stackers to release only the lock for the deflector associated therewith leaving unreleased the lock for the deflector associated with the second of the stackers so that an instrument of still a further order subsequently passing along said guideway will be directed to the second of said stackers, and means operated by the still further ordered instrument when passing to the second of said stackers to release only the lock for the deflector associated therewith.

5. In a machine of the kind described adapted to produce business instruments of different orders, a receiving station including at least a pair of stackers correspondingly as there are different orders of the instruments, a guideway through the receiving station, feed means for advancing instruments toward the different stackers, a deflector associated with each of said stackers and having a normal released position in the plane of the guideway enabling an instrument of a first order to be fed along said guideway past said stackers, means adapted to actuate said deflectors in advance of an instrument of a second order that is to be received in the first of said stackers so that the deflector associated with the first of said stackers when in actuated position is operative to direct said second ordered instrument to the first of said stackers, means to lock said deflectors in actuated position, means operated by the second ordered instrument when passing in to the first of said stackers to release only the lock for the deflector associated with the first of said stackers so that an instrument of still a third order is enabled to pass along said guideway toward the actuated deflector associated with the second of said stackers which in actuated position is operative to direct said third ordered instrument to the second of said stackers, and means operated by said third ordered instrument passing to the second of said stackers to release only the lock for the deflector associated with the second of said stackers.

6. In a machine of the kind described adapted to produce business instruments of different orders, a receiving station including different stackers correspondingly as there are different orders of the instruments, a guideway through the receiving station, feed means for advancing instruments toward the different stackers, a deflector associated with a first one of the stackers and having a normal released position enabling an instrument of one order to be fed along said guideway past said first stacker to a second one of the stackers, means to actuate said deflector in advance of an instrument of another order that is to be received in said first stacker so that the deflector in actuated position is operative to direct said other ordered instrument to the first of said stackers, means arranged along said guideway between the stackers to print the instruments that are to be received in the second of the stackers, and means rendering the printing means operative only when an instrument to be received in the second of the stackers is at printing position.

7. In a machine of the kind described adapted to produce business instruments of different orders, a receiving station including a least a pair of stackers correspondingly as there are different orders of the instruments, a guideway through the receiving station, feed means for advancing the instruments toward the different stackers, a deflector associated with each of said stackers and having a normal released position enabling an instrument of one order to be fed along said guideway past said stackers, means to actuate and lock in actuated position said deflectors in advance of an instrument of another order that is to be received in the first of the stackers so that the actuated deflector associated with the first of the stackers is operative to direct said other ordered instrument to the first of said stackers, means operated by the other ordered instrument when passing to the first of said stackers to release only the lock for the deflector associated therewith leaving unreleased the lock for the deflector associated with the second of the stackers so that an instrument of still a further order subsequently passing along said guideway will be directed to the second of said stackers by the actuated deflector associated therewith, means operated by the still further ordered instrument when passing to the second of said stackers to release the lock for the deflector associated therewith, and printing means disposed along said guideway beyond the second of said stackers to print data on the instruments of the said one order.

8. In a machine of the kind described adapted to produce business instruments of different orders, a receiving station including at least a pair of stackers correspondingly as there are different orders of the instruments, a guideway through the receiving station, feed means for advancing instruments toward the different stackers, a deflector associated with each of said stackers and having a normal released position in the plane of the guideway enabling an instrument of a first order to be fed along said guideway past said stackers, means adapted to elevate simultaneously said deflectors in advance of an instrument of a second order that is to be received in the first of said stackers so that the deflector associated with the first of said stackers when in elevated position is operative to direct said second ordered instrument in to the first of said stackers, means to lock said deflectors in elevated position, means operated by the second ordered instrument when passing in to the first of said stackers to release only the lock for the deflector associated with the first of said stackers so that an instrument of still a third order is enabled to pass along said guideway toward the elevated deflector associated with the second of said stackers operative to direct said third ordered instrument passing to the second of said stackers to release the lock for the deflector associated with the second of said stackers, means disposed along said guideway beyond the second of said stackers to print data on the instruments of the first order, and means rendering operative the printing means only when an instrument of the first order is at printing position.

9. In a machine of the kind described adapted to produce business instruments of different orders, a receiving station including different stackers correspondingly as there are different orders of the instruments, a guideway through the receiving station, feed means for advancing instruments toward the different stackers, feed rollers for feeding the instruments into said stackers, a deflector associated with one of the stackers and having a normal released position enabling an instrument of one order to be fed along said guideway past said one stacker to a second one of the stackers, means to actuate said deflector in advance of an instrument of another order that is to be received in said one stacker so that the deflector in actuated position is operative to direct said other ordered instrument in to the said one stacker, means to lock said deflector in actuated position, means to release said lock upon an instrument passing between the feed rollers, and means along said guideway between the stackers to print data on a face of the instruments to be passed to the second stacker.

10. In a printing machine of the kind described having a printing station for printing a first set of data on one face of business instruments of different orders produced in the machine, a receiving station including different stackers correspondingly as there are different orders of the instruments, a guideway through the receiving station, feed means for advancing instruments toward the different stackers, a deflector associated with one of stackers and having a normal released position enabling an instrument of one order to be fed along said guideway past said one stacker toward a second one of the stackers, means to actuate said deflector in advance of an instrument of another order that is to be received in said one stacker so that the deflector when actuated is operative to direct said other ordered instrument to the said one stacker, printing means along said guideway between the stackers to print data on the instruments of the said one order, and means along said guideway between the printing means and the first stacker to turn over the instruments of the said one order so that said printing means will be operative to print a second set of data on the face thereof opposite the face printed at the aforesaid printing station.

11. In a machine of the kind described adapted to produce business instruments of different orders, a receiving station including at least a pair of stackers correspondingly as there are different orders of the instruments, a guideway through the receiving station, feed means for advancing instruments toward the different stackers, a normally released deflector associated with each of said stackers enabling an instrument of a first order to be fed along said guideway past said stackers, means adapted to actuate said deflectors in advance of an instrument of a second order that is to be received in the first of said stackers so that the deflector associated with the first of said stackers when in actuated position is operative to direct said second ordered instrument to the first of said stackers, means to release from actuated position the deflector associated with the first of said stackers so that an instrument of still a third order is enabled to pass along said guideway toward the actuated deflector associated with the second of said stackers operative to direct said third ordered instrument to the second of said stackers, means to release from actuated position the deflector associated with the second of said stackers, and means along said guideway beyond the second stacker to print instruments of the first order advancing past said deflectors in released position.

12. In a machine of the kind described adapted to produce business instruments of different orders, a receiving station including different stackers correspondingly as there are different orders of the instruments, a guideway through the receiving station, feed rollers for advancing instruments toward the different stackers, a deflector associated with one of the stackers and having a normal released position enabling an instrument of one order to be fed along said guideway past said one stacker to a second one of the stackers, means to elevate above said guideway and lock in elevated position said deflector in advance of an instrument of another order that is to be received in said one stacker so that the deflector in elevated position is operative to direct said other ordered instrument to said one stacker, and means operated by the other instrument when passing into the bite of said feed rollers to release the lock.

13. In a machine of the kind described adapted to produce business instruments of different orders, a receiving station including at least a pair of stackers correspondingly as there are different orders of the instruments, a guideway through the receiving station, pairs of feed rollers along said guideway and associated respectively with said stackers, a deflector associated with each of said stackers and the feed rollers corresponding thereto and having a normal released position enabling an instrument of one order to be fed along said guideway past said stackers, means to simultaneously elevate and lock in elevated position said deflectors in advance of an instrument of another order that is to be received in the first of said stackers so that the elevated deflector associated with the first of the stackers is operative to direct said other ordered instrument to the first of said stackers, means operated by the other ordered instrument when passing in to the bite of the feed rollers associated with the second of the stackers so that an instrument of still a further order subsequently passing along said guideway will be directed to the second of said stackers by the elevated deflector associated therewith, and means operated by the still further ordered instrument when passing in to the bite of the feed rollers associated with the second stacker to release the lock for the deflector associated therewith.

14. In a printing machine of the kind described having a printing station for printing data on a face of business instruments or the like of different orders produced in the machine, a receiving station including a stacker corresponding to one order of the instruments, a guideway through the receiving station, feed means for advancing the instruments of different orders emitted from the printing station toward said stacker and along said guideway, means operative when actuated to deflect the instruments of the said one order into said stacker and when unactuated to direct instruments of another order produced in said machine along said guideway past said stacker, means along said guideway beyond said stacker for turning over the instruments of the said other order passing beyond said stacker so that the face of these instruments that was disposed downwardly on said guideway in advance of the turning means is turned upwardly, and printing means along said guideway beyond the turning means to print data on a face of each instrument that was turned over.

15. In a machine of the kind described adapted to handle business instruments or the like, a guideway, feed means for advancing such instruments along the guideway, at least a flipper mounted for oscillating movement at a turn over station disposed below said guideway and operative to turn certain of the instruments face for face, means to deflect certain of the instruments in the guideway downward to said flipper at the turn over station, means to actuate the flipper through less than 180° upon arrival of each such instrument at the turn over station, and means to deliver each turned over instrument from the turn over station upward to the guideway.

16. In a machine of the kind described adapted to produce business instruments or the like of different orders, a receiving station including a stacker for deposition therein of instruments of one order, a guideway in the receiving station past said stacker along which instruments of another order are to be advanced, feed means and a deflector associated therewith for depositing in said stacker those instruments having the one order, said deflector having a normal released position whereat those instruments having the other order advance along said guideway past the stacker, means to actuate the deflector to operative position whereat those instruments having the one order are directed by the deflector into said stacker, a lock for holding the deflector in actuated position, and means releasing said lock upon deflection in to said stacker of an instrument having the first order.

17. In a printing machine of the kind described having a printing station for printing data on a face of business instruments of different orders produced in the machine, a receiving station including a stacker corresponding to one order of the instruments, a guideway through the receiving station, feed means for advancing the instruments of different order emitted from the printing station toward said stacker and along said guideway, means operative when actuated to deflect the instruments of the said one order into said stacker and when unactuated to direct instruments of another order produced in said machine along said guideway past said stacker, means at a turning station along said guideway beyond said stacker for turning over the instruments of the said other order passing beyond said stacker so that the face of these instruments that was disposed downwardly on said guideway in advance of the turning means is turned upwardly, means to deliver instruments having the said other order from the guideway to said turning station, means to re-deliver back to said guideway the turned over instruments at the turning station and printing means along said guideway beyond the turning station to print data on a face of each instrument that was turned over.

18. In a machine of the kind described adapted to handle business instruments or the like, a guideway, feed means for advancing such instruments along the guideway, at least a flipper at a turn over station beneath said guideway and operative to turn each instrument face for face, means to deflect certain of the instruments in the guideway downwardly to said flipper at the turn over station, oscillatable means to actuate the flipper through less than 180° upon arrival of each such instrument at the turn over station, and means to re-deliver each turned over instrument from the turn over station upwardly to the guideway.

19. In a machine of the kind described adapted to handle business instruments or the like, a guideway, printing means operative on certain of said instruments in the guideway, feed means for advancing certain of said instruments along the guideway toward said printing means, a turn over station beneath said guideway in advance of the printing means where the instruments to be printed are first to be turned face for face, means to deflect the instruments to be printed from said guideway downwardly in to the turn over station, feed means leading upwardly from said turn over station to re-deliver each turned over instrument to the guideway, flipper means at the turn over station operative to turn over the instruments deflected in to the turn over station and to position each such turned over instrument on said upwardly directed feed means, and means to oscillate said flipper means through less than 180°.

20. In a machine of the kind described adapted to produce business instruments or the like of different orders, a receiving station including a stacker for deposition therein of instruments of one order fed out of said machine, a guideway in the receiving station past said stacker along which instruments of another order fed out of said machine are to be advanced, a deflector in said guideway, upper and lower pairs of normally engaged feed rollers adapted to in-feed the instruments of different order toward the deflector, said deflector having a normal released position whereat those instruments having the other order are advanced along said guideway by the feed rollers past the stacker, means to actuate the deflector to operative position whereat those instruments having the one order advanced forwardly by said feed rollers are directed by the deflector into said stacker, a lock for holding the deflector in actuated position, means enabling the upper feed rollers to be relieved of the lower feed rollers when an instrument is fed thereto by said machine, and means for releasing said lock when the upper feed rollers are relieved as aforesaid upon deflection in to said stacker of an instrument having the first order.

21. In a printing machine of the kind described wherein data are to be printed on both sides of an instrument passed through the machine, means at a turn over station for inverting the instrument and comprising an oscillatable shaft having spaced supporting fingers affixed thereto for oscillation therewith, and adapted to engage and support one side of the instrument during inversion thereof, flipper arms affixed to said shaft and having elements associated therewith for engaging and supporting the opposite side of said instrument, said elements being spaced from said fingers to enable an instrument to be located therebetween for inversion, feed bands for receiving the inverted instrument, feed rollers and guide means for feeding and guiding the instrument to be inverted into position between the supporting fingers and the flipper elements, and means for oscillating said shaft to rotate the feed fingers and the flipper arms simultaneously so as to invert an instrument positioned as aforesaid and deliver the thus-positioned instrument to the feed bands.

References Cited in the file of this patent

UNITED STATES PATENTS

| Number | Name | Date |
|---|---|---|
| 1,262,097 | Rinsche | Apr. 9, 1918 |
| 1,299,437 | Duncan | Apr. 8, 1919 |
| 1,405,513 | Hughes | Feb. 7, 1922 |
| 1,651,179 | Bryce | Nov. 29, 1927 |
| 1,669,238 | Goss | May 8, 1928 |
| 1,717,231 | Krell | June 11, 1929 |
| 2,131,919 | Mills | Oct. 4, 1938 |
| 2,362,205 | Huck | Nov. 7, 1944 |
| 2,390,583 | Gollwitzer | Dec. 11, 1945 |
| 2,456,273 | Gruver | Dec. 14, 1948 |
| 2,539,995 | Ghertman | Jan. 30, 1951 |
| 2,566,822 | Cahill | Sept. 4, 1951 |
| 2,624,273 | Wheeler | Jan. 6, 1953 |
| 2,625,101 | Gammeter | Jan. 13, 1953 |
| 2,648,277 | Wockenfuss | Aug. 11, 1953 |
| 2,765,735 | Daly | Oct. 9, 1956 |